United States Patent
Lee et al.

(10) Patent No.: US 10,746,847 B2
(45) Date of Patent: *Aug. 18, 2020

(54) METHOD AND APPARATUS FOR WIRELESS LOCALIZATION OF HIGH ACCURACY

(71) Applicant: KOREA INSTITUTE OF SCIENCE AND TECHNOLOGY, Seoul (KR)

(72) Inventors: Taikjin Lee, Seoul (KR); Youngmin Jhon, Seoul (KR); Jaehun Kim, Seoul (KR); Boseon Yu, Seoul (KR); Beomju Shin, Seoul (KR); Jaewon Bang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/476,901

(22) PCT Filed: Dec. 28, 2017

(86) PCT No.: PCT/KR2017/015649
§ 371 (c)(1),
(2) Date: Jul. 10, 2019

(87) PCT Pub. No.: WO2018/139771
PCT Pub. Date: Aug. 2, 2018

(65) Prior Publication Data
US 2019/0369205 A1    Dec. 5, 2019

(30) Foreign Application Priority Data

Jan. 25, 2017 (KR) ........................ 10-2017-0011988
Sep. 21, 2017 (KR) ........................ 10-2017-0121851

(51) Int. Cl.
*G01S 5/14* (2006.01)
*H04W 4/029* (2018.01)
(Continued)

(52) U.S. Cl.
CPC .............. *G01S 5/14* (2013.01); *G01C 21/206* (2013.01); *G01S 5/0081* (2013.01);
(Continued)

(58) Field of Classification Search
CPC .. H04W 4/02; H04W 64/00; H04L 29/08657; H04L 29/08108; H04L 29/08936;
(Continued)

(56) References Cited

U.S. PATENT DOCUMENTS 6,023,477 A * 2/2000 Dent .................... H04B 7/2675
370/350
6,038,444 A * 3/2000 Schipper ............ H04B 7/18541
455/421

(Continued)

FOREIGN PATENT DOCUMENTS

KR    10-2010-0060784 A    6/2010
KR    10-2012-0010113 A    2/2012
(Continued)

OTHER PUBLICATIONS

International Search Report dated Aug. 9, 2018 in counterpart International Patent Application No. PCT/KR2017/015649 (2 pages in English and 2 pages in Korean).

(Continued)

*Primary Examiner* — Dai Phuong
(74) *Attorney, Agent, or Firm* — NSIP Law

(57) ABSTRACT

The present invention relates to wireless localization method and apparatus of high accuracy, and measures strength of at least one signal that is transmitted from at least one fixed node, estimates a relative position of a moving node, generates a change pattern of at least one signal strength according to relative changes in positions of the moving node over a plurality of time points from at least one signal strength and the relative position of the moving node, and (Continued)

estimates an absolute position of the moving node, based on a comparison between the change pattern of the at least one signal strength and a map of a distribution pattern shape of signal strength in a region where the moving node is located. Accordingly, it is possible to accurately estimate a position of a moving node using a radio signal which not only accurately estimates the position of the moving node even in a change of wireless environment but also has almost no change in signal strength over a wide region.

18 Claims, 13 Drawing Sheets

(51) Int. Cl.
| | |
|---|---|
| *G01S 5/00* | (2006.01) |
| *G01S 5/02* | (2010.01) |
| *G01S 11/06* | (2006.01) |
| *G01S 19/01* | (2010.01) |
| *H04W 88/18* | (2009.01) |
| *G01C 21/20* | (2006.01) |

(52) U.S. Cl.
CPC .......... *G01S 5/0221* (2013.01); *G01S 5/0284* (2013.01); *G01S 11/06* (2013.01); *G01S 19/01* (2013.01); *H04W 4/029* (2018.02); *H04W 88/18* (2013.01)

(58) Field of Classification Search
CPC . G01S 5/0252; G01S 5/02; G01S 5/14; G01S 5/0263; G01S 5/0242; G01S 17/48; G01S 5/16; H04M 1/72572; G01C 21/20
See application file for complete search history.

(56) References Cited

U.S. PATENT DOCUMENTS

| | | | |
|---|---|---|---|
| 2012/0021759 A1* | 1/2012 | Chen | G01S 5/0054 455/456.1 |
| 2017/0013409 A1* | 1/2017 | Cerchio | G01C 25/005 |
| 2017/0188188 A1* | 6/2017 | Kang | H04W 4/029 |
| 2018/0137729 A1* | 5/2018 | Bottazzi | G08B 13/2417 |
| 2018/0234937 A1* | 8/2018 | Yoon | H04W 64/00 |

FOREIGN PATENT DOCUMENTS

| | | |
|---|---|---|
| KR | 10-2013-0020295 A | 2/2013 |
| KR | 10-2015-0063586 A | 6/2015 |
| KR | 10-2016-0035637 A | 4/2016 |

OTHER PUBLICATIONS

Written Opinion of the International Searching Authority dated Aug. 9, 2018 in counterpart International Patent Application No. PCT/KR2017/015649 (8 pages in Korean).

* cited by examiner

FIG. 8

|  | RL1 | RL2 | RL3 | ... | RLn |
|---|---|---|---|---|---|
| AP1 | $RSS_{11}$ | $RSS_{12}$ | $RSS_{13}$ | ... | $RSS_{1n}$ |
| AP2 | $RSS_{21}$ | $RSS_{22}$ | $RSS_{23}$ | ... | $RSS_{2n}$ |
| AP3 | $RSS_{31}$ | $RSS_{32}$ | $RSS_{33}$ | ... | $RSS_{3n}$ |
| ... | ... | ... | ... | ... | ... |
| APm | $RSS_{m1}$ | $RSS_{m2}$ | $RSS_{m3}$ | ... | $RSS_{mn}$ |

(a)

|  | AL1 | AL2 | AL3 | ... | ALn |
|---|---|---|---|---|---|
| AP1 | -41 | -48 | -51 | ... | -63 |
| AP2 | -49 | -46 | -44 | ... | -66 |
| AP3 | -45 | -47 | -50 | ... | -64 |
| ... | ... | ... | ... | ... | ... |
| APm | -47 | -50 | -53 | ... | -65 |

(b)

(a)

(b)

(c)

(d)

METHOD AND APPARATUS FOR WIRELESS LOCALIZATION OF HIGH ACCURACY

CROSS REFERENCE TO RELATED APPLICATIONS

This application is a U.S. National Stage Application of International Application No. PCT/KR2017/015649, filed on Dec. 28, 2017, which claims the benefit under 35 USC 119(a) and 365(b) of Korean Patent Application No. 10-2017-0011988, filed on Jan. 25, 2017 and Korean Patent Application No. 10-2017-0121851, filed on Sep. 21, 2017, in the Korean Intellectual Property Office, the entire disclosure of which is incorporated herein by reference for all purposes.

TECHNICAL FIELD

The present invention relates to a method for wireless localization and an apparatus for wireless localization which can estimate a position of a moving node using a radio signal.

BACKGROUND ART

A global navigation satellite system (GNSS) is a system for estimating positions of moving objects moving all over the earth using a radio wave emitted from a satellite orbiting a space orbit and is widely used for a military purpose such as missile guidance, for tracking a position of a smartphone user, and for a navigation system of a vehicle, a ship, an aircraft, and the like nowadays. Representative examples of the GNSS include a global positioning system (GPS) of the United States, a GLONASS of Russia, Galileo of Europe, a quasi-zenith satellite system (QZSS) of Japan, and the like. However, the GNSS cannot perform a localization in an indoor space where a radio wave emitted from a satellite cannot reach and has a problem that localization accuracy is significantly decreased in the center of a city due to blocking, reflection, and the like of the radio wave by skyscrapers.

In recent years, automobile manufacturers around the world, and global corporations such as Google and Intel have fostered research and development of an autonomous vehicle. However, partial autonomous driving in an outdoor space makes some results, but autonomous driving in an indoor space and an outdoor space is still impossible due to inability of an indoor localization of the GNSS. In order to solve the problem of the GNSS, a wireless localization technique for estimating a position of a user or a vehicle using a radio signal existing in an indoor space draws much attention. The wireless localization technology is currently being commercialized and serviced, but localization accuracy is very low compared with the GNSS, and thus, various types of wireless localization technology are under development.

Wireless communication can be classified into short-range wireless communication and wide-area wireless communication. A representative example of the short-range wireless communication includes Wi-Fi, Bluetooth, Zigbee, and the like, and a representative example of the wide-area wireless communication includes 3rd generation (3G), 4th generation (4G), Lora, and the like. Long term evolution (LTE) is a kind of 4G wireless communication. The short-range wireless communication such as Bluetooth and Zig-Bee is not suitable for a localization because of characteristics that temporarily occur in an indoor space according to needs of a user and disappear. Currently, a Wi-Fi signal and an LTE signal are known to be distributed in most indoor spaces.

Accordingly, a WiFi position system (WPS) that performs a localization using a Wi-Fi signal of a band of 2.4 GHz is in the spotlight. A representative localization technique which uses the WiFi signal may include a triangulation technique and a fingerprint technique. The triangulation technique estimates a position by measuring a received signal strength (RSS) from three or more access points (APs) and converting the received signal strength into a distance. However, since attenuation, reflection, diffraction, or the like of a radio signal occurs due to a wall of a building, an obstacle, people, and the like in an indoor space, the converted distance value includes a large error, and thereby, the triangulation technique is rarely used for an indoor localization.

For this reason, the fingerprint technique is mainly used in the indoor space. This technique divides the indoor space into a grid structure, collects values of signal strength in each unit area, and builds a radio map by storing the values in a database. In a state where the radio map is built as described above, a position of a user is estimated by comparing strength of the signal received at the position of the user with data of the radio map. Since the technique collects data in which spatial characteristics of the indoor space is reflected, the technique has an advantage that localization accuracy is higher than the triangulation technique. As wireless environment is good and many signals are collected by finely dividing the indoor space, the localization precision may be increased up to 2 to 3 meters.

The fingerprint technique performs relatively accurate localization in a case where there is little difference between strength of a signal collected at the time of building a radio map and strength of a signal collected at the time of localization. However, a change in the wireless environment, such as a signal interference between communication channels frequently occurring in the real world, expansion of an access point, occurrence of failure or an obstacle, and the like leads to collection of signal strength different from data of a radio map built in the past, which results in a serious impact on localization accuracy. Accordingly, various attempts have been made to increase the localization accuracy by applying a k-nearest neighbor (KNN), a particle filter or the like to the fingerprint technique.

First of all, due to the fact that a Wi-Fi signal is distributed actually only in a part of the center of a city due to characteristic of short-range wireless communication, the fingerprint technique has an inherent limitation that cannot be used alone for a vehicle navigation system requiring a localization service in both an indoor space and an outdoor space, or autonomous driving. The LTE signal is uniformly distributed in the indoor space and the outdoor space, but there is a limitation to increase a localization accuracy because an area where a change in the signal strength is not large is wide. As a result, the localization service which uses the LTE signal remains at a level in which an approximate position of a user is provided, and there are still many problems to be used for a vehicle navigation system or autonomous driving in which a localization error can lead to an accident.

DISCLOSURE

Technical Problem

There is provided wireless localization method and apparatus of high accuracy which can estimate a position of a moving node of high accuracy even in a case where the position of the moving node is estimated by using a radio signal that not only can estimate the position of the moving node of high accuracy even in a change of wireless environment but also has almost no change in signal strength over a wide region. In addition, there is provided a computer-readable recording medium in which a program for causing a computer to perform the above-described wireless localization method is recorded. The present invention is not limited to the above-described technical problems as described above, and another technical problem may be derived from the following description.

Technical Solution

A wireless localization method according to one aspect of the present invention includes measuring strength of at least one signal that is transmitted from at least one fixed node; estimating a relative position of a moving node; generating a change pattern of at least one signal strength according to relative changes in positions of the moving node over a plurality of time points from the measured at least one signal strength and the estimated relative position of the moving node; and estimating an absolute position of the moving node, based on a comparison between the generated change pattern of the at least one signal strength and a map of a distribution pattern shape of signal strength in a region where the moving node is located.

The change pattern of the at least one signal strength may be a change pattern of at least one signal strength that is represented as continuous arrangement of at least one signal strength which is received a plurality of times at a plurality of relative positions of the moving node that is estimated at the plurality of time points. The generating of the change pattern of the at least one signal strength may generate a pattern of at least one signal strength that is currently received from the measured at least one signal strength and the estimated relative position of the moving node, and may generate the change pattern of the at least one signal strength by continuously arranging the pattern of the generated at least one signal on a pattern of at least one signal which is received prior to the received time point.

The generating of the change pattern of the at least one signal strength may generate the change pattern of the at least one signal strength by accumulating pattern data representing a pattern of at least one signal strength that is received from the at least one fixed node at the estimated relative position on pattern data for a relative position which is estimated prior to estimation of the relative position.

The generating of the change pattern of the at least one signal strength may generate the pattern data from spatial domain data representing the measured each signal strength in association with the estimated relative position. The wireless localization method may further include generating time domain data representing the measured each signal strength in association with a certain time point; and converting the generated time domain data into the spatial domain data.

The certain timepoint may be a reception time point of the each signal, and the measured relative position may be a relative position of the moving node that is estimated at the reception time point of each signal. If a distance difference between the estimated relative position and the relative position of the moving node that is estimated immediately before the relative position is estimated is within a distance corresponding to a resolution unit of coordinates for representing the relative position of the moving node, accumulation of pattern data representing a pattern of at least one signal strength which is received from the at least one fixed node at the estimated relative position may be omitted.

The wireless localization may further include estimating the relative position of the moving node with respect to an estimated absolute position of the moving node after the absolute position of the moving node is estimated, and a change pattern of at least one signal strength according to a relative change of a position of the moving node may be generated from the relative position of the moving node that is estimated with respect to the absolute position of the moving node after the plurality of time points.

The wireless localization method may further include searching a part having a pattern most similar to the change pattern of the at least one signal strength within the map by comparing the change pattern of the at least one signal strength with the map, and the estimating of the absolute position of the moving node may estimate an absolute position of a map indicated by the searched part as the absolute position of the moving node. The estimating of the absolute position of the moving node may estimate an absolute position corresponding to the estimated relative position among a plurality of absolute positions of the searched part the absolute position of the moving node.

The generating of the change pattern of the at least one signal strength may generate a pattern of a geometric surface shape that graphically representing a change of at least one signal strength according to a relative change of a position of the moving node in such a manner that a dot is marked on a point of a multidimensional space which is determined by mapping an ID of a certain fixed node on a first axis of the multidimensional space, mapping the relative position of the moving node on a second axis, and mapping strength of a signal which is transmitted from the certain fixed node on a third axis.

The wireless localization method of may further include searching a surface part having a shape most similar to the surface shape within the map by comparing the pattern of the surface shape with the map, and the estimating of the absolute position of the moving node may estimate an absolute position of the map that is indicated by the searched surface part as the absolute position of the moving node. The estimating of the absolute position of the moving node may estimate an absolute position of a part having a shape most similar to a shape of the estimated relative position among a plurality of absolute positions of the searched surface part as the absolute position of the moving node.

The wireless localization method may further include selecting at least one cluster among clusters in an entire region where a localization service is provided, based on the received at least one signal; and extracting map data representing the map from a radio map in which distribution data of signal strength in the entire region is recorded.

According to another aspect of the present invention, there is provided a computer-readable recording medium in which a program for causing a computer to execute the above-described wireless localization method is recorded.

According to still another aspect of the present invention, a wireless localization apparatus includes a signal processing unit that measures strength of at least one signal which is transmitted from at least one fixed node; a relative position estimation unit that estimates a relative position of a moving node; a pattern generation unit that generates a change pattern of at least one signal strength according to relative changes in positions of the moving node over a plurality of time points from the measured at least one signal strength and the estimated relative position of the moving node; and an absolute position estimation unit that estimates an absolute position of the moving node, based on a comparison between the generated change pattern of the at least one signal strength and a map of a distribution pattern shape of signal strength in a region where the moving node is located.

The wireless localization apparatus may further include a sensor unit that senses movement of the moving node, and the relative position estimation unit may estimate the relative position of the moving node from a value of an output signal of the sensor unit.

The wireless localization apparatus may further include a buffer that accumulates pattern data which is generated by the pattern generation unit, and the pattern generation unit may generate the change pattern of the at least one signal strength by accumulating pattern data representing a pattern of at least one signal strength that is received from the at least one fixed node at the estimated relative position on pattern data which is stored in the buffer and storing the accumulated data.

Advantageous Effects

Even in a case where a wireless environment change such as signal interference between communication channels, extension of an access point, or occurrence of a failure or an obstacle is made, a position of a moving node can be estimated with high accuracy by measuring strength of at least one signal received from at least one fixed node, estimating a relative position of the moving node, generating a change pattern of at least one signal strength according to a relative change of a position of a moving node over a plurality of time points, and estimating an absolute position of the moving node using the change pattern of the signal strength.

Since the wireless localization technique of related art estimates an absolute position of a moving node using strength of at least one signal currently received, in a case where a signal strength different from strength of a signal collected at the time of building a radio map due to a wireless environment change is measured, there is a very high probability that a current position of the moving node is estimated as another position adjacent thereto rather than an actual position. Meanwhile, since the absolute position of the moving node is estimated by using a change pattern of at least one signal strength according to a relative change of a position of the moving node over a plurality of time points, the present invention is rarely influenced by a wireless environment change, and thereby, a localization error due to the wireless environment change is greatly reduced as compared with the wireless localization technique of related art.

Even in a case where the position of the moving node is estimated by using a radio signal having almost no change in signal strength over a wide area, such as an LTE signal, the absolute position of the moving node is estimated using the change pattern of at least one signal strength according to the relative change of the position of the moving node over the plurality of time points, and thus, the position of the moving node can be accurately estimated. This is because, even if there is almost no change in the signal strength between the adjacent localization points on a movement route of the moving node, strength of the LTE signal sufficiently changes to the extent that the position of the moving node 1 is accurately estimated within a movement distance corresponding to a length of a change pattern of the signal strength used for the localization of the present invention.

As described above, since the position of the moving node can be accurately estimated by using the LTE signal in which the signal strength rarely changes between the measurement points on the movement route, it is possible to provide a wireless localization service that covers an outdoor space and an internal area. As a result, a wireless localization service for a vehicle navigation system or autonomous driving which can perform both an indoor localization and an outdoor localization can be provided, and thereby, it is possible to replace GPS which is most widely used as a vehicle navigation system nowadays but cannot perform the indoor localization.

In addition, since the relative position of the moving node is estimated with respect to the previously estimated absolute position of the moving node after the absolute position of the moving node is estimated, error accumulation of a relative position estimation algorithm such as pedestrian dead reckoning (PDR) according to a continuous estimation of the relative positions, and dead reckoning (DR) rarely occurs, and thus, localization accuracy is much higher than that of a technique in which the relative position estimation algorithm such as the PDR and the DR is combined with the wireless localization method of related art.

In addition, since the position of the moving node is estimated by using a three-dimensional pattern of a geometric surface shape which graphically representing a change in at least one signal strength according to the relative change in the position of the moving node, a localization error of the algorithm of related art according to a comparison between a numerical value of a currently received signal strength with a numerical value of signal strength distributed in a radio map can be originally blocked, and thus, localization accuracy of the moving node can be greatly improved. Since a wireless environment change at the current position of the moving node rarely influence the entire shape of a surface, when a surface part having a shape most similar to a surface shape of the three-dimensional pattern is searched within a map represented by map data, there is a very low possibility that a surface part different from the surface part to be originally searched is searched due to an error of the strength of the currently receive signal.

DESCRIPTION OF THE DRAWINGS

FIGS. 8A and 8B are table forms illustrating accumulation of pattern data used for the wireless localization according to the present embodiment.

MODE OF THE INVENTION

Hereinafter, embodiments of the present invention will be described in detail with reference to the drawings. Hereinafter, all moving objects, which are localization targets, such as a smartphone carried by a user and a navigation system mounted on a vehicle, will be collectively referred to as a "moving node". In addition, communication devices, which are fixedly installed in regions and relay wireless communication of a moving node, such as an access point (AP) of a WiFi network and a base station of an LTE network, will be collectively referred to as a "fixed node". In addition, a radio frequency (RF) signal transmitted from the fixed node will be briefly referred to as a "signal".

An embodiment of the present invention that will be described below relates to wireless localization method and apparatus which provide a localization service using a radio signal such as a Wi-Fi signal or a long term evolution (LTE) signal, and particularly, to wireless localization method and apparatus of high accuracy which can estimate a position of a moving node of high accuracy even in a case where localization is performed by using a radio signal such as an LTE signal which not only can estimate a position of the moving node of high accuracy even in a change of wireless environment but also has almost no change in signal strength over a wide region. Hereinafter, the wireless localization method and the wireless localization apparatus will be briefly referred to as a "wireless localization method" and a "wireless localization apparatus".

Figure 1:
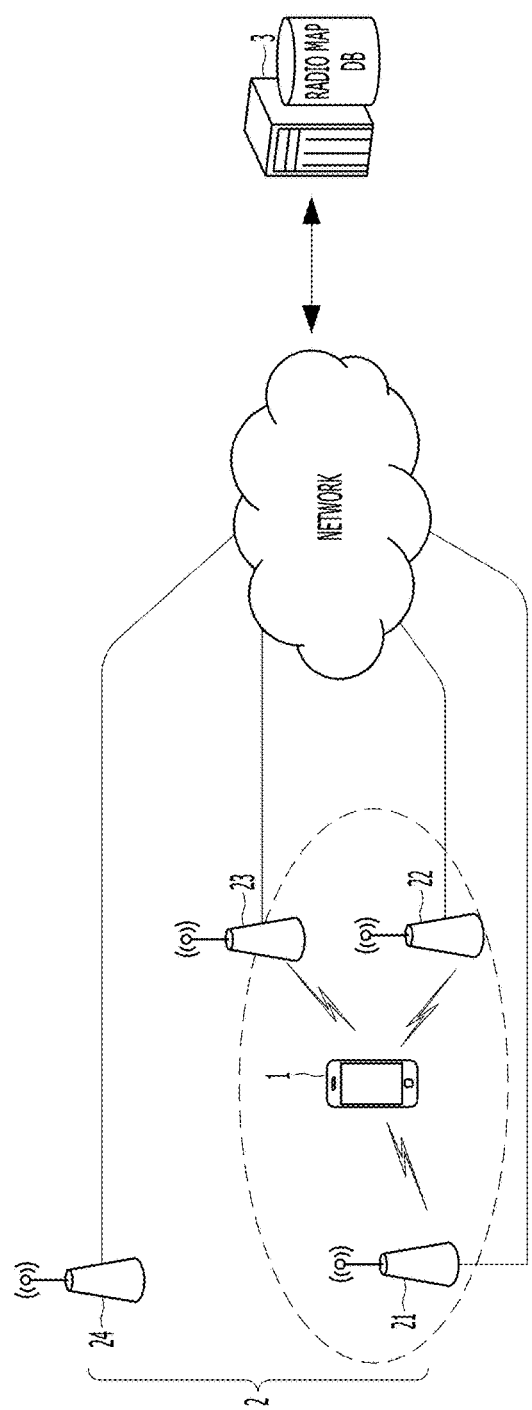
FIG. 1 is a configuration diagram of a wireless communication system according to an embodiment of the present invention.

FIG. 1 is a configuration diagram of a wireless communication system according to an embodiment of the present invention. Referring to FIG. 1, the wireless communication system according to the present embodiment is configured with a plurality of moving nodes 1, a plurality of fixed nodes 2, and a localization server 3. Each of the plurality of moving nodes 1 performs wireless communication with another node through at least one type of wireless communication network while moving in a state of being carried by a user or mounted on a vehicle. In general, each moving node 1 performs wireless communication through at least two types of wireless communication networks, for example, a Wi-Fi network and an LTE network. Each of the plurality of fixed nodes 2 relays the wireless communication of each moving node 1 such that each moving node 1 can access the wireless communication network to perform wireless communication with nodes. In a case where the moving node 1 performs wireless communication through the Wi-Fi network, the fixed node may be an access point, and in a case where the moving node performs the wireless communication through an LTE network, the fixed node may be a base station. The localization server 3 provides each moving node 1 with a part of a radio map necessary for the wireless localization according to the present embodiment.

Figure 2:
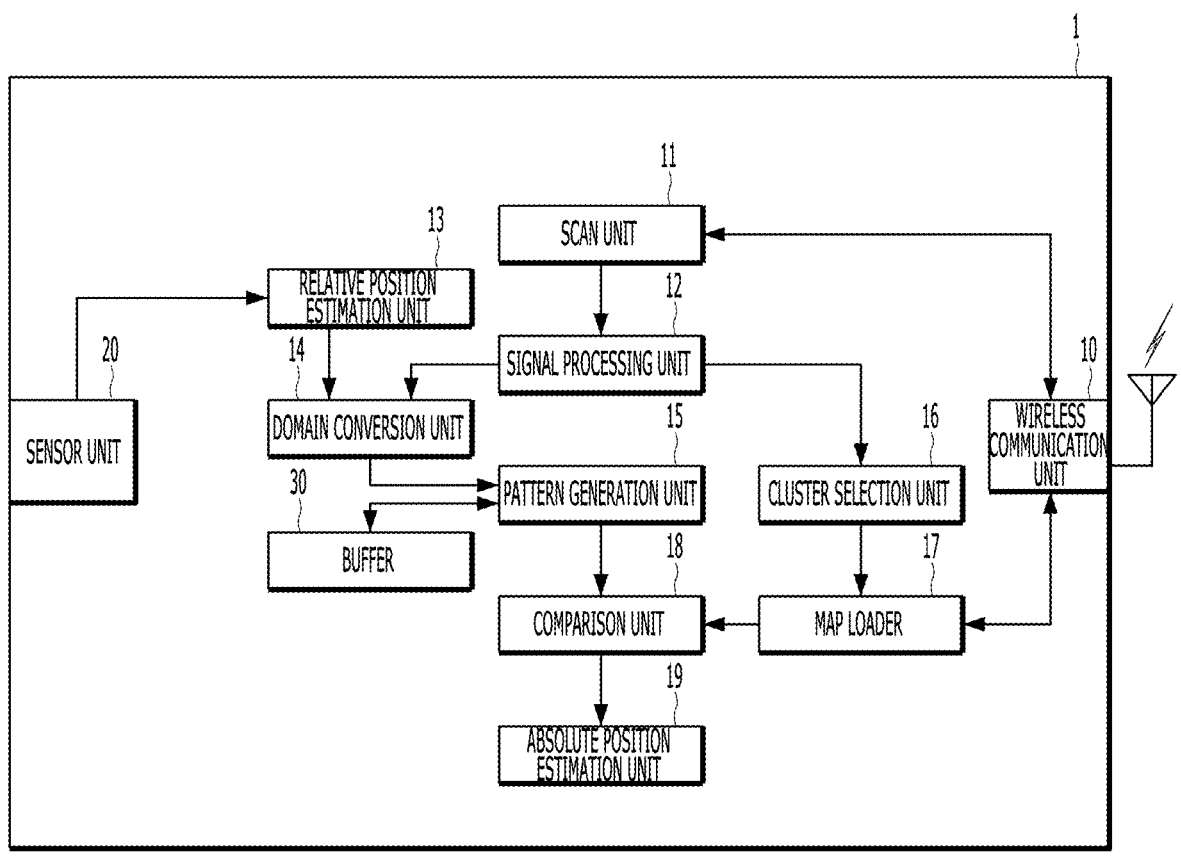
FIG. 2 is a configuration diagram of a wireless localization apparatus of a moving node illustrated in FIG. 1.

FIG. 2 is a configuration diagram of the wireless localization apparatus of the moving node 1 illustrated in FIG. 1. Referring to FIG. 2, the wireless localization apparatus of the moving node 1 illustrated in FIG. 1 includes a wireless communication unit 10, a sensor unit 20, a buffer 30, a scan unit 11, a signal processing unit 12, a relative position estimation unit 13, a domain conversion unit 14, a pattern generation unit 15, a cluster selection unit 16, a map loader 17, a comparison unit 18, and an absolute position estimation unit 19. Those skilled in the art will appreciate that such configuration elements may be realized by hardware which provides a particular function or may be realized by a combination of a memory, a processor, a bus, and the like in which software providing a particular function is stored. Each of the above-described configuration elements is not necessarily realized by separate hardware, and a plurality of the configuration elements may be realized by common hardware, for example, a combination of a processor, a memory, a bus, and the like.

As described above, the moving node 1 may be a smartphone carried by a user or may be a navigation system mounted on a vehicle. The embodiment illustrated in FIG. 2 relates to a wireless localization apparatus, and if other configurations of a smartphone or other configurations of a navigation system are illustrated in FIG. 2 in addition to the configuration of the wireless localization apparatus illustrated in FIG. 2, characteristics of the present embodiment may be degraded, and thus, the other configurations are not illustrated. Those skilled in the art will understand that, in a case where the moving node 1 is realized by the smartphone or the navigation system, other configuration elements besides the configuration elements illustrated in FIG. 2 can be added.

The wireless communication unit 10 transmits and receives signals through at least one wireless communication network. The sensor unit 20 includes at least one sensor which senses movement of the moving node 1. The buffer 30 is used for accumulating pattern data generated by the pattern generation unit 15. The sensor unit 20 may include an acceleration sensor that measures an acceleration of the moving node 1 and a gyro sensor that measures an angular velocity of the moving node 1. A sensor type of the sensor unit 20 may be changed depending on what type of device the moving node 1 is configured. In a case where the moving node 1 is configured by a smartphone, the sensor unit 20 may be configured by an acceleration sensor and a gyro sensor described above. In a case where the moving node 1 is configured by a navigation system mounted on a vehicle, the sensor unit 20 may be configured by the acceleration sensor and the gyro sensor described above, and an encoder, a geomagnetic sensor, and the like may be used instead of the sensors.

Figure 3:
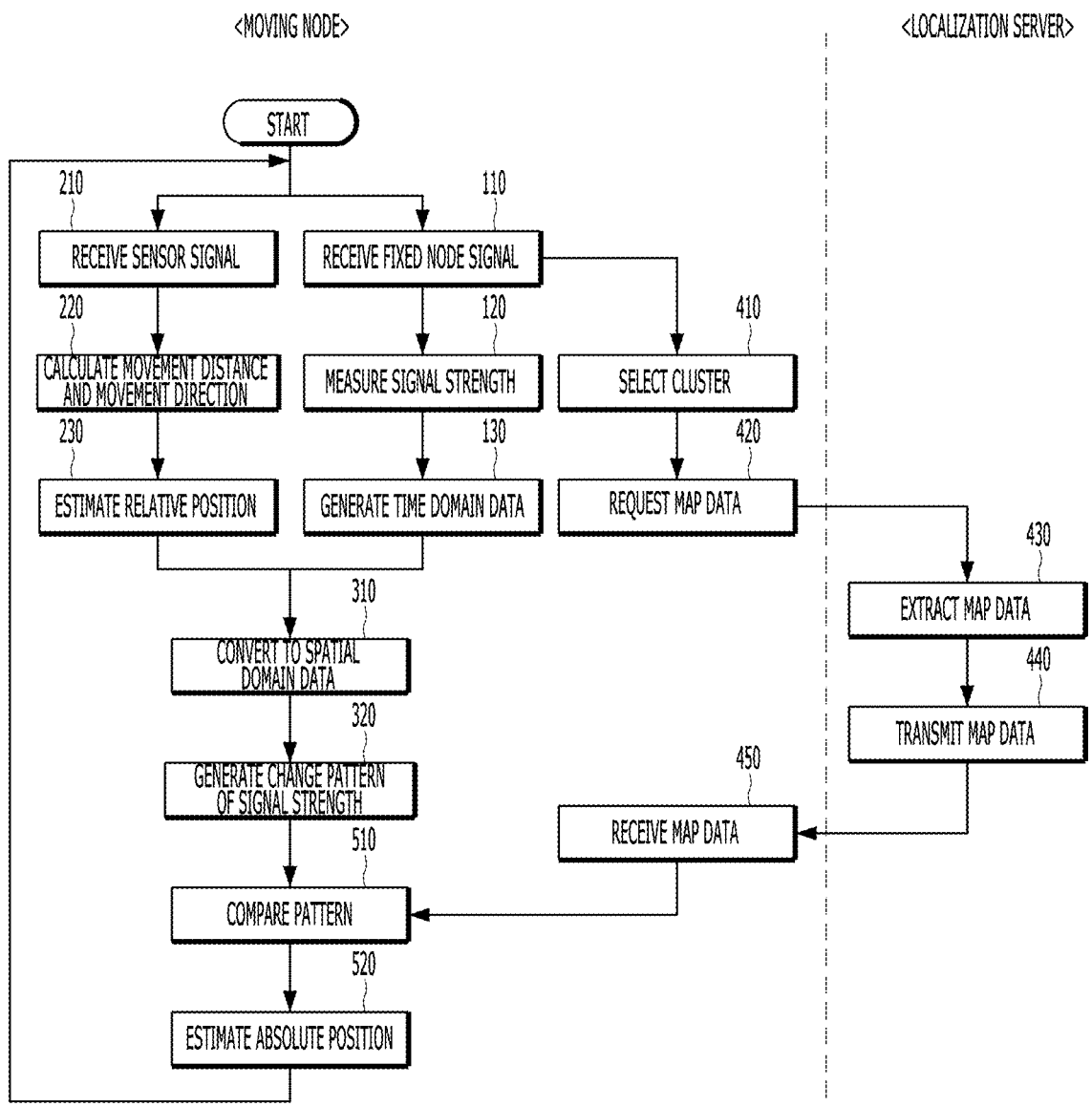
FIG. 3 is a flowchart of a wireless localization method according to an embodiment of the present invention.

FIG. 3 is a flowchart of a wireless localization method according to an embodiment of the present invention. Referring to FIG. 3, the wireless localization method according to the present embodiment is configured by the following steps performed by the wireless localization apparatus of the moving node 1 illustrated in FIG. 2. Hereinafter, the scan unit 11, the signal processing unit 12, the relative position estimation unit 13, the domain conversion unit 14, the pattern generation unit 15, the cluster selection unit 15, the map loader 16, the comparison unit 18, and the absolute position estimation unit 19 which are illustrated in FIG. 2 will be described in detail with reference to FIG. 3. In step 110, the scan unit 11 of the moving node 1 periodically scans a frequency band of the wireless communication through the wireless communication unit 10, thereby, receiving at least one signal transmitted from at least one fixed node 2. A sampling rate of time domain data which will be described below is determined according to a length of a scan period of the scan unit 11. The shorter the scan period of the wireless communication unit 10, the higher the sampling rate of the time domain data which will be described below, and as a result, precision of an absolute position of the moving node 1 estimated according to the present embodiment can be improved.

If the sampling rate of the time domain data increases, the amount of the time domain data increases, and thereby, a data processing load of the moving node 1 increases, and time required for estimating an absolute position of the moving node 1 can increase. Since a present position has to be provided to a user in real time due to characteristics of wireless localization which is used for the purpose of tracking a position of the user, navigating a vehicle, and the like, it is preferable that the scan period of the wireless communication unit 10 is determined in consideration of a hardware performance of the moving node 1, localization precision required for a field to which the present embodiment is applied, and the like. Since an ID of the fixed node 2 is included in a signal transmitted from a certain fixed node 2, it is possible to know the ID of the fixed node 2 from the signal transmitted from the fixed node 2.

In a case where only one fixed node 2 exists within a communicable range at a current position of the moving node 1, the wireless communication unit 10 receives one signal from one fixed node 2 through a scanning process. In a case where a plurality of fixed nodes 2 exist within the communicable range at the current position of the moving node 1, the wireless communication unit 10 receives a plurality of signals corresponding to the plurality of fixed nodes 2 from the plurality of fixed nodes 2 through the scanning process. FIG. 1 illustrates an example in which the moving node 1 receives three signals from three fixed nodes 21, 22, and 23. It can be seen that the other fixed node 24 is located outside the communicable range of the moving node 1. Since the present embodiment can be applied to a region where a wireless communication infrastructure is relatively well equipped, the moving node 1 mostly receives signals of the plurality of fixed nodes 2, but a signal of one fixed node 2 can also be received at some regions where the wireless communication infrastructure is weak. Meanwhile, in a case where no signal is received in the scanning process, the localization itself according to the present embodiment is impossible, and thereby, the moving node 1 waits until receiving the signal of the fixed node 2.

In step 120, the signal processing unit 12 of the moving node 1 measures strength of each signal received in step 110. In step 130, the signal processing unit 12 of the moving node 1 generates time domain data in which the strength of each signal measured in step 120 is represented in association with any one time point. Here, any one time point is used as information for distinguishing the signal received in step 110 from a signal received previously or a signal received thereafter. This time point may be a time point when each signal is received. A reception time point of each signal may be a time point when time of an internal timepiece in the moving node 1 is read at the moment when the signal processing unit 12 receives each signal from the wireless communication unit 10.

More specifically, in step 130, the signal processing unit 12 of the moving node 1 generates time domain data including IDs of the fixed nodes 2 that transmit each signal for each signal received in step 110, reception time points of each signal, and at least one signal strength set $\{RSS_{mn}, \ldots\}_{TD}$ in which the strengths of each signal measured in step 120 are grouped into one set. Here, RSS is an abbreviation of "received signal strength", TD is an abbreviation of "time domain", a subscript "m" represents a sequence number of IDs of the fixed nodes 2, and "n" represents a sequence number of reception time points of each signal.

For example, if the wireless localization method illustrated in FIG. 3 is repeatedly performed three times, the scan unit 11 scans peripheral signals three times. If the scan unit 11 receives only one signal transmitted from the fixed node 2 having the second ID when a third signal is scanned, the time domain data includes only one signal strength set $RSS_{23}$. If the scan unit 11 receives the signal transmitted from the fixed node 2 having the second ID and the signal transmitted from the fixed node 2 having the third ID when the third signal is scanned, the time domain data includes the signal strength sets $RSS_{23}$ and $RSS_{33}$.

As described above, the time domain data may be data for dividing the strength of each signal measured in step 302 into the IDs of the fixed nodes 2 that transmit each signal in a time domain and the reception time point of each signal. Each time the wireless localization method according to the present embodiment is implemented, the reception time points of the plurality of signal strength sets $\{RSS_{mn}, \ldots\}_{TD}$ included in the time domain data generated in step 130 are all the same. Accordingly, in order to reduce a length of the time domain data, IDs of a plurality of fixed nodes and strengths of a plurality of signals may be arranged and attached to one time point for the signals collected at the same time point. It will be understood by those skilled in the art that the time domain data can be expressed in various formats besides the above-described format.

In step 210, the relative position estimation unit 13 of the moving node 1 periodically receives an output signal of the sensor unit 20. In step 220, the relative position estimation unit 13 of the moving node 1 calculates a movement distance and a movement direction of the moving node 1 from a value of the output signal of the sensor unit 20 received in step 210. In step 230, the relative position estimation unit 13 of the moving node 1 calculates a relative change of a current position of the moving node 1 with respect to a previous position of the moving node 1 on the basis of the movement distance and the movement direction of the moving node 1 calculated in step 220, thereby, estimating the current relative position of the moving node 1 with respect to the previous position of the moving node 1. Here, when the wireless localization method according to the present embodiment is first implemented, the previous position of the moving node 1 becomes a reference point of a cluster which will be described below and after the relative position with respect to the reference point is estimated, and after a relative position with respect to the reference point is estimated, the previous position of the moving node 1 becomes a relative position estimated immediately before the relative position to be currently estimated.

As described below, in the process of converting a domain in which a signal strength is represented from a time domain to a spatial domain, the reception timepoint of each signal is replaced with the relative position of the moving node 1 at the reception time point, and thus, it is preferable that the relative position estimation unit 13 periodically calculates the relative position of the moving node 1 in synchronization with a scan period of the scan unit 11. In order to increase precision of the relative position of the moving node 1, the relative position estimation unit 13 may calculate the relative position of the moving node 1 at a period shorter than the scan period of the scan unit 11. As described above, since a sensor type of the sensor unit 20 can be changed depending on what type of device the moving node 1 is configured, different navigation algorithms can be used for estimating the relative position of the moving node 1 depending on what type of device the moving node 1 is configured.

For example, in a case where the moving node 1 is a smartphone, the relative position estimation unit 13 may estimate the relative position of the moving node 1 using a pedestrian dead reckoning (PDR) algorithm. More specifically, the relative position estimation unit 13 can calculate a movement distance of the moving node 1 by integrating a value of an output signal of an acceleration sensor of the sensor unit 20 and can calculate a movement direction in the moving node 1 by integrating a value of an output signal of a gyro sensor in the moving node 1. In a case where the moving node 1 is mounted on a vehicle as a navigation system, the relative position estimation unit 13 can estimate the relative position of the moving node 1 using a dead reckoning (DR) algorithm. For example, the relative position estimation unit 13 can calculate the movement distance and the movement direction of the moving node 1 by attaching the acceleration sensor and the gyro sensor of the sensor unit 20 to a wheel of a vehicle.

When the wireless localization method illustrated in FIG. 3 is implemented again after being executed, the relative position estimation unit 13 estimates the relative position of the moving node with respect to an absolute position of the moving node 1 estimated in step 520 after estimating the absolute position of the moving node 1 in step 520 which will be described below. Therefore, after a change pattern of at least one signal strength according to a relative change of the position of the moving node 1 over a plurality of points or time is generated in step 320, that is, after the plurality of time points, a change pattern of at least one signal strength according to the relative change of the position of the moving node 1 is generated from the relative position of the moving node estimated with respect to the absolute position of the moving node 1. According to the present embodiment, the relative position of the moving node 1 is not continuously estimated on the basis of a previous relative position of the moving node 1, but is estimated on the basis of the absolute position when the relative position of the moving node 1 is replaced with the absolute position, and thus, a section to which estimation of the relative position of the moving node 1 is applied is very short, and thereby, an error of the absolute position of the moving node 1 caused by error accumulation of the relative position due to repeated estimation of the relative position rarely occurs.

As described above, since the PDR and DR algorithms for estimating the relative position of the moving node 1 estimate the relative position of the moving node 1 through integration of the values of the output signals of the sensors, as estimation of the relative position is repeated, errors of the relative position of the moving node 1 are accumulated. Accordingly, the longer the section to which the estimation of the relative position of the moving node 1 is applied, the more the error of the relative position of the moving node 1 increases. In the present embodiment, since the relative position of the moving node 1 is replaced with the absolute position in the middle of the estimation of the relative position of the moving node 1, error accumulation of the relative position due to repeated estimation of the relative position rarely occurs. Accordingly, accuracy of the localization according to the present embodiment is very high as compared with a technique in which the relative position estimation algorithm such as the PDR or the DR is combined with a wireless localization technique of related art.

After the absolute position of the moving node 1 is estimated in accordance with the present embodiment, the absolute position may be estimated for each relative position of the moving node 1 estimated thereafter, and one absolute position may be estimated after the relative position of the moving node 1 estimated thereafter is estimated many times. In the former case, after the absolute position of the moving node 1 is estimated, a previous position of the moving node 1 constantly becomes the absolute position estimated immediately before the relative position to be currently estimated. In the latter case, shortly after the absolute position of the moving node 1 is estimated, the previous position of the moving node 1 becomes the absolute position estimated immediately before the relative position to be currently estimated, but thereafter, the previous position of the moving node becomes the relative position estimated immediately before the relative position to be currently estimated until the position is estimated by the above-described number of times.

In step 310, the domain conversion unit 14 of the moving node 1 converts the time domain data generated in step 130 into spatial domain data in which strength of each signal measured in step 120 is represented in association with the relative position of the moving node 1 estimated in step 230. In more detail, the domain conversion unit 14 converts the time domain data into at least one signal strength set $\{RSS_{mn}, \ldots\}_{SD}$ in which IDs of the fixed nodes 2, the relative position of the moving node 1, and the strengths of each signal are grouped into one set by replacing reception time point of each signal with the relative position of the moving node 1 corresponding to the reception time point of each signal, among the IDs of the fixed nodes 2, the reception time point of each signal, and the strength of each signal which is represented by each set $RSS_{mn}$ for each set of at least one signal strength set $\{RSS_{mn}, \ldots\}_{TD}$ included in the time domain data generated in step 130.

Here, RSS is an abbreviation of "Received Signal Strength", SD is an abbreviation of "Space Domain", a subscript "m" represents a sequence number of the IDs of the fixed nodes 2, and "n" represents a sequence number of the relative positions of the moving node 1 corresponding to the sequence number of the reception time points of each signal. In a case where reception of the signal in step 110 and reception of the signal in step 210 are performed at substantially the same time in synchronization with each other, the relative positions of the moving node 1 corresponding to the reception time points of each signal may be the relative positions of the moving node 1 estimated in the reception time points of each signal. In this case, the sequence number of the reception time points of each signal is the sequence number of the relative positions of the moving node 1 as it is. For example, the signal strength set $RSS_{23}$ included in the spatial domain data indicates the strength of a signal received from the fixed node 2 having the second ID when the relative position estimation unit 13 estimates the third relative position.

If the reception of the signal in step 110 and the reception of the signal in step 210 are not synchronized with each other, the relative position of the moving node 1 corresponding to the reception time point of each signal may be the relative position estimated nearest to the reception timepoint of each signal among the relative positions estimated in multiple time points. In this manner, the time domain data is time-based data in which the strength of each signal is associated with the reception timepoint of each signal by grouping the ID of the fixed node 2, the reception time point of each signal, and the strengths of each signal into one set, whereas the spatial domain data is a space-based data in which the strength of each signal is associated with the relative position of the moving node 1 by grouping the ID of the fixed node 2 included in the time domain data, the relative position of the moving node 1 estimated in the timepoint included in the time domain data, and the strength of each signal included in the time domain data into one set.

Since the reception time points of a plurality of signal strength sets $\{RSS_{mn}, \ldots\}_{TD}$ included in the time domain data generated in step 130 are all the same each time the wireless localization method according to the present embodiment is implemented, the relative positions of the plurality of signal strength sets $\{RSS_{mn}, \ldots\}_{SD}$ included in the spatial domain data converted in step 310 are all the same each time the wireless localization method is implemented. Accordingly, in order to reduce a length of the spatial domain data, IDs of a plurality of fixed nodes and strengths of a plurality of signals may be arranged and attached to one relative position for the signals collected at the same relative position. It will be understood by those skilled in the art that spatial domain data can be expressed in various formats besides the above-described format.

in step 320, the pattern generation unit 15 of the moving node 1 generates a change pattern of at least one signal strength according to a relative change of the position of the moving node over a plurality of time points from the at least one signal strength measured in step 120 and the relative position of the moving node 1 estimated in step 230. In more detail, the pattern generation unit 15 generates a pattern of at least one signal strength currently received in step 110 from at least one signal strength measured in step 120 and the relative position of the moving node 1 estimated in step 230, and successively arranges the pattern of the currently received at least one signal on a pattern of at least one signal received before the reception time point of the signal in step 110, thereby, generating the change pattern of the at least one signal strength according to the relative change of the position of the moving node 1 over a plurality of time points. The wireless localization method according to the present embodiment is a method for repeatedly estimating a current absolute position in real time when the moving node 1 moves through a certain route, and the steps illustrated in FIG. 3 are continuously repeated while the wireless localization apparatus illustrated in FIG. 2 is driven.

Figure 4:
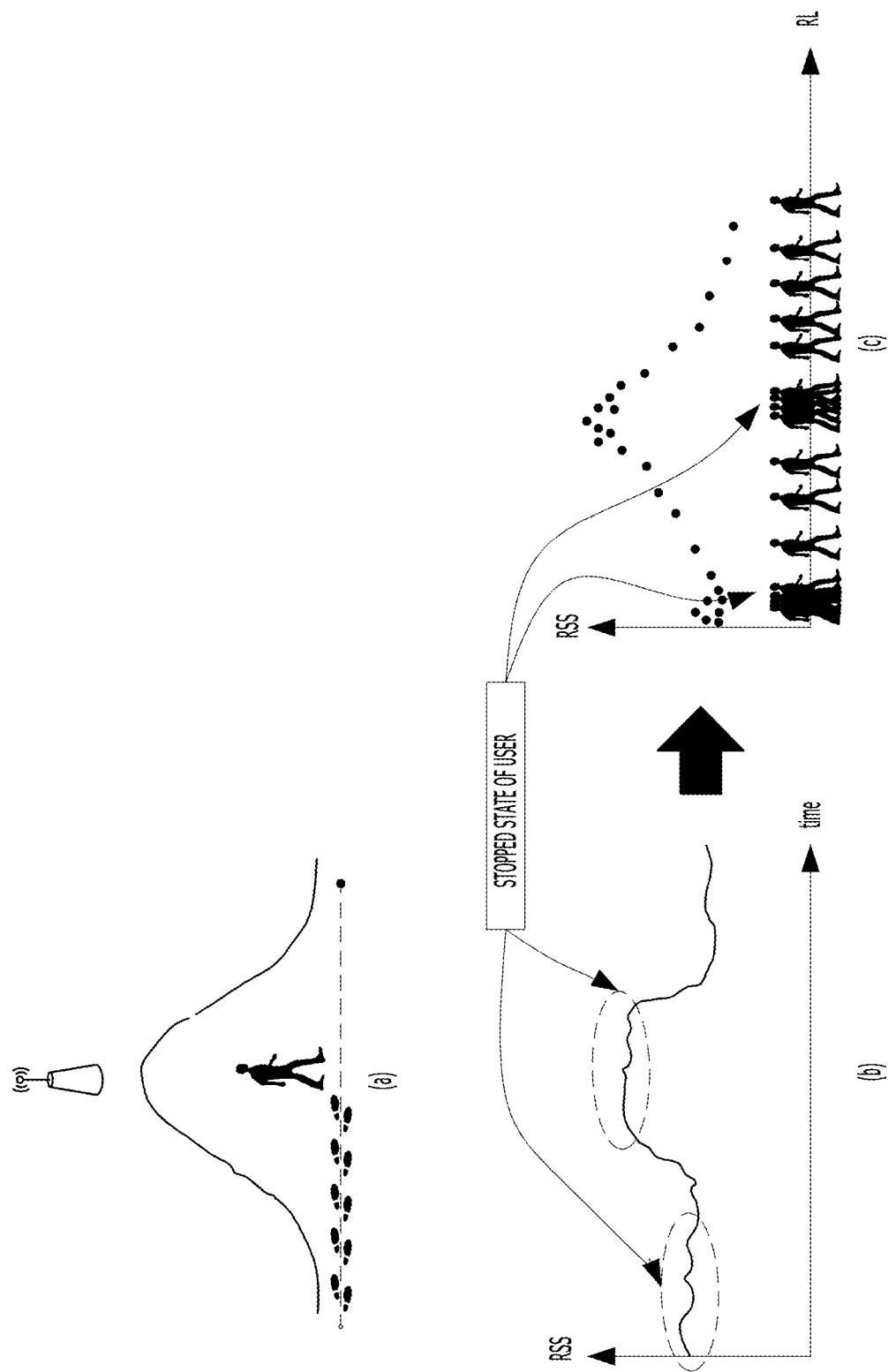
FIG. 4 is a diagram illustrating a pattern formation principle in step 320 of FIG. 3.

FIG. 4 is a diagram illustrating a pattern formation principle in step 320 of FIG. 3. Referring to (a) of FIG. 4, a strength of a signal transmitted from the fixed node 2 is attenuated approximately in inverse proportion to square of a distance from the fixed node 2. In a case where a user approaches and moves away from the fixed node 2, the moving node 1 carried by the user receives a signal having the strength illustrated in (a) of FIG. 4. In general, the user does not constantly walk at a constant speed and may stop temporarily while walking. While the user temporarily stops, even if the wireless localization method illustrated in FIG. 3 is repeatedly implemented many times, the strength of the signal transmitted from the fixed node 2 is measured approximately the same as illustrated in (b) of FIG. 4. The x-axis in (b) of FIG. 4 represents a time point when the signal strength is measured, and the y-axis represents the signal strength. The x-axis in (c) of FIG. 4 represents a relative position (RL) of the moving node 1 and the y-axis represents the signal strength.

Since the strength of the signal transmitted from the fixed node 2 is measured each time the wireless localization method illustrated in FIG. 3 is implemented, the strength of the signal transmitted from the fixed node 2 is not represented in a continuous curve shape as illustrated in (b) of FIG. 4, and is actually represented in a shape in which dots represented at a height corresponding to the strength of the signal are continuously arranged. If a reception point to time of each signal is replaced with the relative position of the moving node 1 by the domain conversion unit 14, change patterns of the signal strength generated by the pattern generation unit 15 are represented as continuous arrangement of the signal strengths received a plurality of times at a plurality of relative positions of the moving node 1 estimated at a plurality of time points as illustrated in (c) of FIG. 4. Accordingly, it can be said that the change pattern of at least one signal strength generated by the pattern generation unit 15 is a change pattern of at least one signal strength represented as continuous arrangement of at least one signal strength received a plurality of times.

A database of the localization server 3 stores a radio map indicating a pattern of distribution of the signal strengths collected in all regions where the wireless localization service according to the present embodiment is provided. When a user repeatedly moves through the same route several times, times necessary for moving the entire route is generally different from each other. In a case where movement routes of a user are the same, even if the times necessary for moving the entire route are different, several positions of the user on the route are the same. Accordingly, reflecting a reception time point of the signal transmitted from the fixed node 2 in the radio map is not only impossible, but also unnecessary. That is, the radio map is represented by a map of a distribution pattern shape of signal strength in which the ID of the fixed node 2 from which a signal is transmitted, an absolute position of a point at which the signal is received, and a strength of the signal are reflected with respect to a large number of signals collected in the entire region where the wireless localization service is provided.

In order to estimate the absolute position of the moving node 1 according to the present embodiment, a pattern that can be matched to the radio map has to be generated. Since localization of the moving node 1 is performed in a state where a position of the moving node 1 is not known, the moving node 1 generates time domain data representing each signal strength in association with a reception time point of each signal, and thereafter, converts the time domain data into spatial domain data in which each signal strength is associated with the relative position of the moving node 1 corresponding to the reception time point of each signal. In order to determine coordinates of the radio map, a region of the real world in which the wireless localization service is provided is divided into a grid structure in which distances between scales are constant. Since a value of the absolute position of a certain point on the radio map is represented by two-dimensional coordinates having a resolution of this unit in multiple proportion, it is preferable that the relative position of the moving node 1 is estimated in a state where a pattern generated by the pattern generation unit 15 has resolution equal to or lower than the coordinate resolution of the radio map in multiple proportions if possible.

As illustrated in (c) of FIG. 4, as a user is in a temporarily stopped state, a plurality of dots representing the strength of a plurality of signals received at a plurality of relative positions of the moving node 1 may be concentrated. In this case, if a maximum distance between the plurality of concentrated dots is within a distance corresponding to a coordinate resolution unit of the radio map, that is, a resolution unit of coordinates for representing the relative position of the moving node 1, there is an effect that the plurality of concentrated dots represent one signal strength as one dot, which causes a change pattern of the signal strength to be generated. For example, if the coordinate resolution unit of the radio map is 1 meter, there is an effect that several dots concentrated within one meter represent one signal strength as one dot, which causes a change pattern of the signal strength to be generated.

Figure 5:
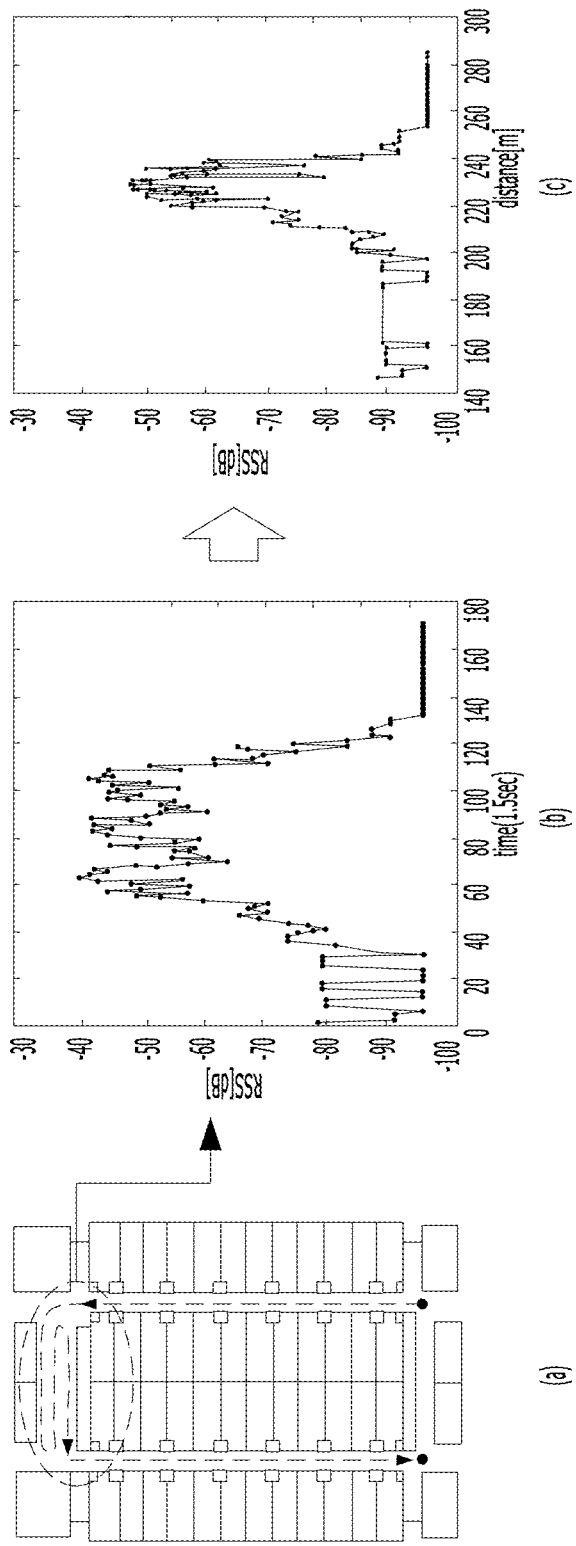
FIG. 5 is a diagram illustrating experimental results of the pattern formation in step 320 of FIG. 3.

FIG. 5 is a diagram illustrating experimental results of the pattern formation in step 320 of FIG. 3. The experiment illustrated in FIG. 5 is intended to help understanding of the change pattern of the signal strength generated as a strength value of an actually measured signal is converted into a spatial domain at a time domain of the real world. As described below, the change pattern of the signal strength according to the present embodiment is not a pattern of a two-dimensional graph shape in FIG. 5 but a pattern of a three-dimensional graph shape. As illustrated in (a) of FIG. 5, a user wandered a passage of a building with a smartphone equipped with an Android application for measuring a signal strength of Wi-Fi. One access point was installed in the center of a front wall of a back passage of the building. The user continued to move forward, turned left, repeatedly moved forward and backward the back passage of the building three times, turned left, and continued to move forward. At this time, the user approached the access point three times and moved away therefrom.

The x-axis of (b) of FIG. 5 represents time points when the signal strength was measured by the Android application. Since the Android operating system is designed to input a Wi-Fi signal into the application every 1.5 seconds, a time resolution on the x-axis of (b) of FIG. 5 is denoted as 1.5 seconds. If the wireless localization method according to the present embodiment is implemented by the Android application, a WiFi signal can be provided every 1.5 seconds, and thereby, an interval between reception time points of signal in step 110 is maximum 1.5 seconds. The y-axis of (b) of FIG. 5 represents the signal strength measured by the Android application. A height of each dot illustrated in (b) of FIG. 5 is the strength of each signal measured by the Android application.

As illustrated in (b) of FIG. 5, there are three peak points in the change pattern of the signal strength measured in the back passage of the building. If the reception time point of each signal is replaced with the relative position of the moving node 1 estimated by using the PDR in accordance with the present embodiment, the graph of (b) of FIG. 5 is converted into a graph in a spatial domain as illustrated in (c) of FIG. 5. The x-axis of (c) of FIG. 5 represents a relative position of a smartphone. The relative position of the smartphone is denoted by a movement distance with respect to an initial position. The y-axis of (c) of FIG. 5 represents the signal strength measured by the Android application in the same manner as in the y-axis of (b) of FIG. 5. Referring to (c) of FIG. 5, the signal strengths in various relative positions concentrated each other are represented to overlap each other, and thus, it can be seen that the three peaks in the time domain are represented as one peak in the spatial domain.

Figure 6:
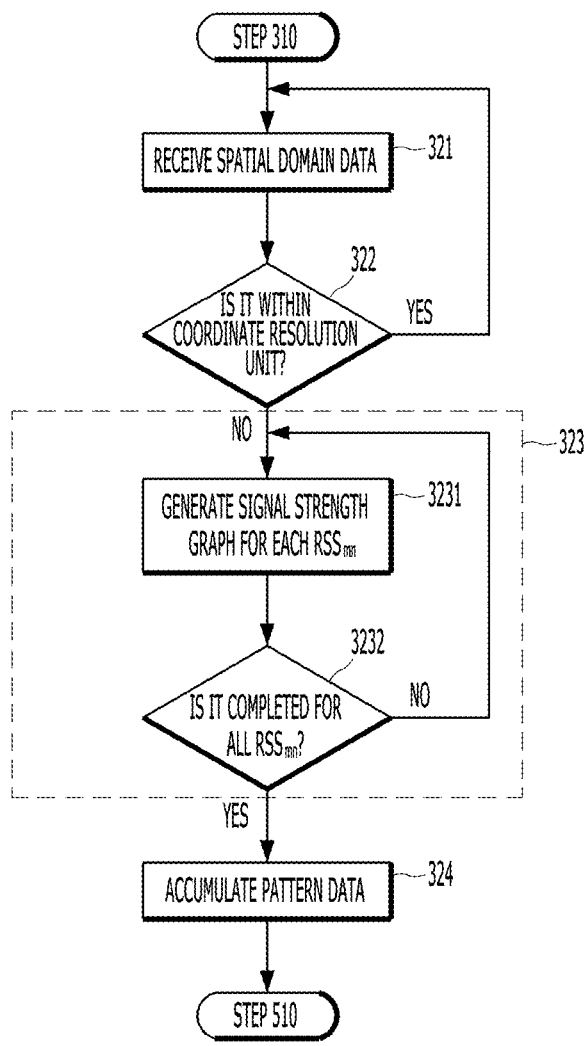
FIG. 6 is a detailed flowchart of step 320 illustrated in FIG. 3.

FIG. 6 is a detailed flowchart of step 320 illustrated in FIG. 3. Referring to FIG. 6, step 320 illustrated in FIG. 3 includes the following steps performed by the pattern generation unit 15 illustrated in FIG. 3. In step 321, the pattern generation unit 15 receives new spatial domain data from the domain conversion unit 14. In step 322, the pattern generation unit 15 confirms whether or not a distance difference between the relative position of the moving node 1 represented by the spatial domain data received in step 321, that is, the relative position estimated in step 230 and the relative position of the moving node 1 estimated immediately before the relative position is estimated is within a distance corresponding to a resolution unit of coordinates for representing the relative position. As a result of confirmation in step 322, if the distance difference between a current relative position and an immediately preceding relative position of the moving node 1 is within the distance corresponding to the resolution unit of coordinates, the processing returns to step 321 and waits until new spatial domain data is received again. Otherwise, the processing proceeds to step 323.

As described above, if the distance difference between the relative position estimated in step 230 and the relative position of the moving node 1 estimated immediately before the relative position is estimated is within the distance corresponding to the resolution unit of the coordinates for representing the relative position of the moving node 1, generation and accumulation of the pattern data in steps 323 and 324 which will be described below may be omitted. As described above, as the wireless localization method illustrated in FIG. 3 is repeatedly implemented several times, the relative position of the moving node 1 is measured a plurality of times, and in a case where a maximum distance between the plurality of relative positions is within the distance corresponding to the resolution unit of the coordinates, even if a plurality of signal strengths for a plurality of relative positions are reflected in a pattern generation process of the pattern generation unit 15, there is an effect that the plurality of signal strengths represent one signal strength as one relative position, which causes a change pattern of the signal strength to be generated.

Therefore, even if the processing is performed from step 321 to step 323 without going through step 322, accuracy of the localization according to the present embodiment is not influenced. However, if the signal strength is repeatedly represented at various positions within the distance corresponding to the resolution unit of the coordinates, although a shape of the change pattern of the signal strength generated by the pattern generation unit 15 is rarely influenced, a process of repeatedly representing the signal strength may influence the real time wireless localization as throughput of graphic data of the moving node 1 is increased. Accordingly, in a case where throughput performance of the graphic data of the moving node 1 is low, omission of the generation and accumulation of the pattern data in step 322 may be useful.

In step 323, the pattern generation unit 15 generates a pattern of at least one signal strength received from at least one fixed node 2 at a relative position of the moving node 1 estimated in step 230, from the spatial domain data received in step 310. In step 323, the pattern of at least one signal strength generated by the pattern generation unit 15 is a pattern of at least one signal strength generated by representing at least one signal strength represented by spatial domain data for at least one fixed node represented by the spatial domain data at a relative position represented by the spatial domain data of a movement route of the moving node 1. In step 323, the pattern generation unit 15 generates the pattern of at least one signal strength by generating a signal strength graph representing a signal strength of each signal strength set $RSS_{mn}$ for each signal strength set $RSS_{mn}$ of at least one signal strength set $\{RSS_{mn}, \ldots\}_{SD}$ included in the spatial domain data received in step 310.

Figure 7:
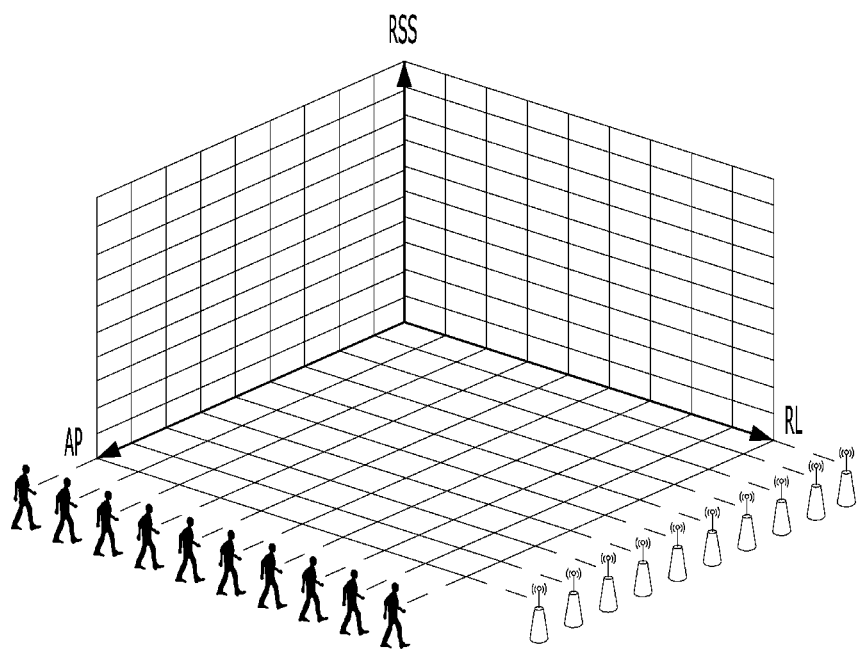
FIG. 7 is a diagram illustrating a three-dimensional spatial coordinate system for generating a change pattern of a signal strength used for a wireless localization according to the present embodiment.

FIG. 7 is a diagram illustrating a three-dimensional spatial coordinate system for generating a change pattern of a signal strength used for the wireless localization according to the present embodiment. Referring to FIG. 7, the x-axis of a three-dimensional space is a coordinate axis in which IDs of a plurality of fixed nodes 2 are arranged at a regular interval, the y-axis is a coordinate axis in which a movement route of the moving node 1 is divided into resolution units of coordinates for representing the relative position of the moving node 1, and the z-axis is a coordinate axis in which a measurement range of the strength of a signal received from the plurality of fixed nodes 2 is divided into measurement resolution units of the signal strength. It will be understood by those skilled in the art that information represented by each of the x-axis, the y-axis, and the z-axis of the three-dimensional space can be exchanged with each other. For example, the x-axis may represent the relative position of the moving node 1, and the y-axis may represent the ID of the fixed node 2.

The three-dimensional space coordinate system illustrated in FIG. 7 is based on the assumption that a movement route of a user or a vehicle is determined as in a case of a road in the center of a city, and in a case where a radio map stored in the database of the localization server 3 is built based on collected signals while moving along a route determined as such, a distribution pattern of signal strengths of the radio map which will be described below includes the movement route. That is, in a case where the change pattern of a current signal strength of the moving node 1 coincides with a certain part of the radio map, it is possible to know a point of the movement route where the moving node 1 is located by comparing with the radio map. In a case where the movement route of the moving node 1 is not determined or a height of the moving node 1 is estimated in addition to the position of the moving node 1 on the ground, It may be necessary to generate a change pattern of at least one signal strength received in step 110 for multi-dimensional spatial coordinate system higher than four-dimensional spatial coordinate system.

In order to facilitate understanding of the present embodiment, ten access points corresponding to the fixed node 2 of a Wi-Fi network are arranged in the x-axis of FIG. 7, and users carrying the moving nodes 1 are arranged at a length of 10 meter at intervals of 1 meter. Accordingly, the resolution unit of the relative position coordinates of the moving node 1 is 1 meter. As described below, the change pattern of the signal strength compared with a map represented by map data in step 510 is a three-dimensional pattern generated in the three-dimensional space of a size illustrated in FIG. 7. That is, the size of the three-dimensional space illustrated in FIG. 7 means that a change pattern of signal strength compared with the map represented by the map data is generated at intervals of 10 meters with respect to a route where the moving node 1 moves during the localization according to the present embodiment. At this time, the number of access points on the movement route of the moving node 1 is 10. The three-dimensional space coordinate system illustrated in FIG. 7 is only an example, and the number of access points and the length of the movement route of the moving node 1 may be variously modified and designed. Step 323 may be divided into the following steps 3231 and 3232, and hereinafter, the pattern forming process in step 323 will be described in detail with reference to FIG. 7.

In step 3231, the pattern generation unit 15 generates a graph illustrating the signal strengths of the signal strength set $RSS_{mn}$ in such a manner that a dot is marked on a point of a three-dimensional space determined by mapping an ID of the fixed node represented by any one of the signal strength sets $RSS_{mn}$ included in the spatial domain data received in step 321 on the x-axis of a three-dimensional space, mapping the relative positions of the moving node 1 represented by the strength set $RSS_{mn}$ on the y-axis, and mapping strengths of the signals represented by the signal strength set $RSS_{mn}$ on the z-axis. The signal strength graph is not an image output graph to be shown to a user, but is a graphical element at an intermediate stage for showing a process of generating a change pattern of a signal strength in the form of a three-dimensional graph used for wireless localization. However, in order to facilitate understanding of the present embodiment, description will be hereinafter made below by assuming that a signal strength graph for each signal strength set $RSS_{mn}$, a pattern of the signal strength at a relative position, and a change pattern of a signal strength according to a change in the relative position can be visually recognized.

In step 3232, the pattern generation unit 15 confirms whether or not generation of the signal strength graph is completed in step 3231 for all the signal strength sets $RSS_{mn}$ included in the spatial domain data received in step 321. If the generation of the signal strength graph for all the signal strength sets $RSS_{mn}$ is completed as a result of confirmation in step 3232, generation of the pattern for the spatial domain data received in step 321 is determined to be completed and the processing proceeds to step 324. Otherwise, another signal strength set $RSS_{mn}$ is extracted for which a signal strength graph is not generated yet among the plurality of signal strength sets $RSS_{mn}$ included in the spatial domain data, and the processing returns to step 3231.

As described above, the pattern of at least one signal strength generated by the pattern generation unit 15 means a pattern of at least one signal strength representing at least one signal strength represented by the spatial domain data in accordance with an ID of at least one fixed node represented by the spatial domain data and a relative position represented by the spatial domain data. Accordingly, if the moving node 1 receives only one signal, the pattern of the signal strength at the relative position of the moving node 1 estimated in step 230 may be one dot shape. If the moving node 1 receives a plurality of signals, the pattern of the signal strength at the relative position of the moving node 1 estimated in step 230 may be a linear line shape or a curved shape represented by a plurality of adjacent dots.

In step 324, the pattern generation unit 15 accumulates pattern data representing the pattern of at least one signal strength generated in step 313 on the pattern data stored in the buffer 30 and store the accumulated data. The change pattern of at least one signal strength measured in step 120 is generated by accumulating the pattern data. The pattern data necessary for generating the change pattern of the signal strength compared with the map represented by the map data can be accumulated in the buffer 30, and a larger amount of pattern data can be accumulated. In the latter case, the change pattern of the signal strength is generated from a part of the pattern data accumulated in the buffer 30.

FIGS. 8A and 8B are table forms illustrating the accumulation of pattern data used for the wireless localization according to the present embodiment. In FIG. 8A, the pattern data accumulated in the buffer 30 is represented in a table form. In step 320, the pattern generation unit 15 may accumulate the spatial domain data in the buffer 30 in the table form of FIG. 8B. In the table of FIG. 8A, a value "m" of "APm" corresponds to coordinate values of the x-axis in a three-dimensional space as a sequence number of IDs of the fixed nodes 2, a value "n" of "RLn" corresponds to coordinate values of the y-axis in the three-dimensional space as a sequence number of relative positions of the moving node 1, and "$RSS_{mn}$" corresponds to coordinate values of z-axis in the three-dimensional space as strengths of signals which are transmitted from the fixed nodes 2 having IDs "APm" and are received at relative positions "RLn" of the moving node 1.

According to the pattern generating method of the pattern generation unit 15 described above, since a dot is represented at a height corresponding to the value "$RSS_{mn}$" at a point of a two-dimensional plane determined by the value "m" of "APm" and the value "n" of "RLn", a set of "$RSS_{mn}$" illustrated in FIG. 8A forms a geometric surface in the three-dimensional space. As described above, in step 320, the pattern generation unit 15 generates a three-dimensional pattern of a geometric surface shape that graphically representing a change of at least one signal strength according to a relative change of a position of the moving node 1 in such a manner that a dot is marked on a point of the three-dimensional space determined by mapping the ID of one fixed node on the x-axis of the three-dimensional space, mapping the relative position of the moving node 1 on the y-axis, and mapping the strength of a signal which is transmitted from the fixed node and is received at the relative position on the z-axis. A plurality of signal strength sets included in the spatial domain data accumulated in the buffer 30 may not accumulate in the buffer 30 in the table form of FIG. 8A and may be accumulated in the buffer 30 in various forms for efficient use of a memory space.

Figure 9:
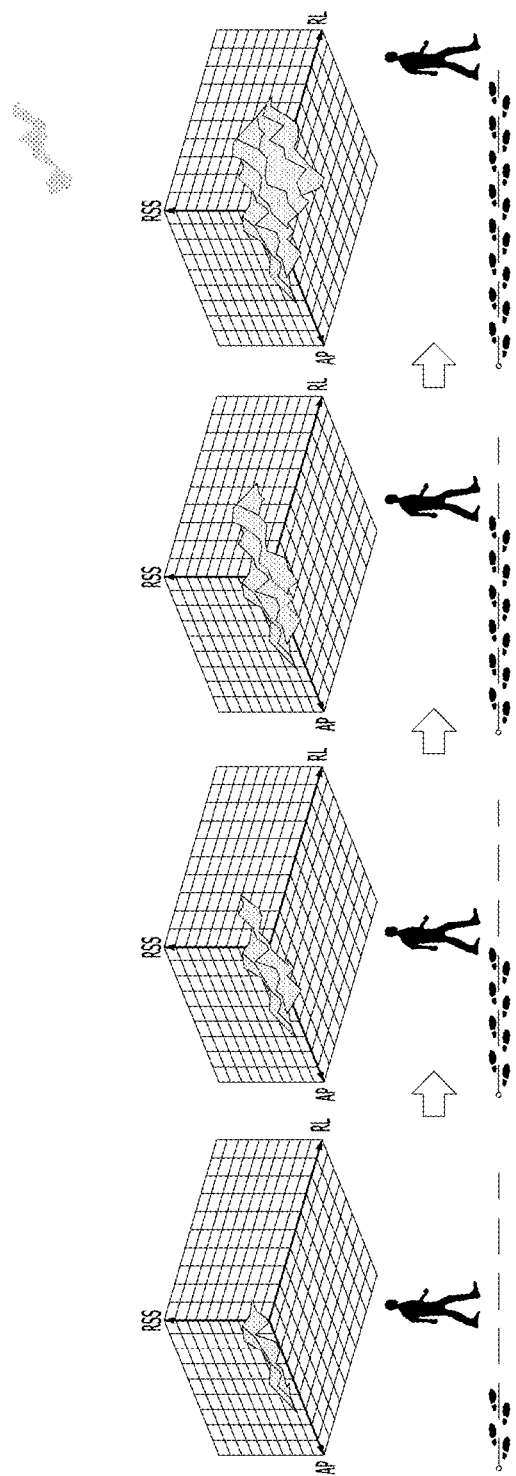
FIG. 9 is a diagram illustrating an example in which the change pattern of the signal strength used for the wireless localization according to the present embodiment is generated.

FIG. 9 is a diagram illustrating an example in which the change pattern of the signal strength used for the wireless localization according to the present embodiment is generated. When a user moves by 20 meters under the assumption that a scale of the three-dimensional space coordinate system illustrated in FIG. 9 is 10 times a scale of the three-dimensional space coordinate system illustrated in FIG. 7, the relative position of the moving node 1 is estimated 20 times and a three-dimensional pattern of a surface shape corresponding to the movement distance is generated by a pattern at each of the 20 relative positions, according to a pattern generation technique of the pattern generation unit 15 described above. A surface illustrated in FIG. 9 is formed by concentrated dots of heights different from each other. It can be seen that, when a user moves 40 meters, 60 meters, and 80 meters, the three-dimensional pattern of the surface shape is expanded by the amount of addition of the movement distance. A curvature of the surface is generated due to a strength difference between signals transmitted from the adjacent fixed nodes 2, that is, a difference between adjacent "$RSS_{mn}$".

In step 410, the cluster selection unit 16 of the moving node 1 selects at least one cluster among the clusters in the entire region where the localization service according to the present embodiment is provided, based on at least one signal received in step 110. The entire region where the wireless localization service is provided is divided into a plurality of clusters. More specifically, the cluster selection unit 16 selects one cluster in which the moving node 1 is located, based on the ID of at least one fixed node 2 included in at least one signal received in step 110. For example, in a case where a certain fixed node 2 transmits a signal to only a specified cluster, or in a case where a signal of a combination of a plurality of fixed nodes 2 can be received only in a specified cluster, a cluster can be selected only by the ID of at least one fixed node 2.

If the cluster selection unit 16 is not able to select one cluster in which the moving node 1 is located, based on the ID of at least one fixed node 2, the cluster selection unit selects one cluster in which the moving node 1 is located, based on strength of at least one signal received in step 110. For example, in a case where a certain fixed node 2 transmits a signal to two adjacent clusters, or in a case where a signal of a combination of a plurality of fixed nodes 2 can be received in two adjacent clusters, a cluster can be selected based on the strength of at least one signal. The cluster selection unit 16 may select a plurality of clusters by adding a peripheral cluster to the cluster selected as described above. For example, in a case where the moving node 1 is located at a boundary between two adjacent clusters or in a case where accuracy of the wireless localization needs to be improved by increasing the number of clusters, a plurality of clusters may be selected.

In step 420, the map loader 17 of the moving node 1 transmits a signal requesting transmission of map data corresponding to at least one cluster selected in step 310 to the localization server 3 via the wireless communication unit 10. This signal includes data representing at least one cluster selected in step 410. In step 430, if receiving the signal requesting the map data transmitted from the moving node 1, the localization server 3 extracts the map data representing a map of a distribution pattern shape of signal strength of a region corresponding to at least one cluster represented by the request signal, that is, at least one cluster selected in step 410, from the radio map in which distribution data of the signal strength in the entire region where the localization service according to the present embodiment is provided is recorded. The radio map is stored in a database of the localization server 3.

In step 440, the localization server 3 transmits the map data extracted in step 430 to the moving node 1. In step 450, the moving node 1 receives the map data transmitted from the localization server 3. For example, the moving node 1 can receive the map data illustrated in FIG. 8B. In the table of FIG. 8B, the value "m" of "APm" is a sequence number of the ID of the fixed node 2 installed in the region of at least one cluster selected in step 410, the value "n" of "ALn" is a sequence number of the absolute value (AL) of the moving node 1, and "$RSS_{mn}$" is the strength of the signal which is transmitted from the fixed node 2 having an ID of "APm" and is received at the absolute position "ALn" of the moving node 1.

Since the pattern data accumulated in the buffer 30 of the moving node 1 and the map data received from the localization server 3 have to match each other, a format of the map data is the same as a format of the pattern data. Accordingly, the description of the pattern data described above will substitute for description of the map data. Since the map data is extracted from the radio map built by generating a database in which strengths of a large number of signals collected from regions where the wireless localization service is provided is stored, the "$RSS_{mn}$" value of FIG. 8B is represented as a specified value. If the moving node 1 includes a database enough to accommodate the radio map stored in the database of the localization server 3, the moving node 1 can extract the map data from the radio map stored in an internal database thereof. In this case, the steps 420, 440, and 450 may be omitted, and the step 430 is performed by the moving node 1.

In step 510, the comparison unit 18 of the moving node 1 compares a change pattern of at least one signal strength generated in step 320 with a map represented by the map data received in step 450, that is, a map of a distribution pattern shape of signal strength in a region where the moving node 1 is located, thereby, searching a part having a pattern most similar to the change pattern of at least one signal strength generated in step 320 within the map represented by the map data. More specifically, the comparison unit 18 compares a three-dimensional pattern of a geometric surface shape graphically representing a change of at least one signal strength generated in step 320 with a map represented by the map data received in step 450, thereby, searching a surface part having a shape most similar to the surface shape of the three-dimensional pattern graphically representing the change of at least one signal strength generated in step 320 within the map represented by the map data received in step 450.

As described above, the present embodiment determines where the change pattern of at least one signal strength generated in step 320 is located within the map represented by the map data received in step 450, based on a surface correlation between the change pattern of at least one signal strength generated in step 320 and the distribution pattern of the signal strength represented by the map data received in step 450. For example, the surface correlation may be calculated by using a three-dimensional shape matching algorithm known to those skilled in the art to which the present embodiment belongs. In step 520, the absolute position estimation unit 19 of the moving node 1 estimates the surface part searched by the comparison in step 510, more specifically, the absolute position of the map represented by the searched surface part, as the absolute position of the moving node 1.

As described above, the present embodiment does not consider only the currently received signal strength like the related art, but estimates the position of the moving node 1 using the change pattern of at least one signal strength according to the relative change of the position of the moving node 1 over the plurality of time points so far unlike the related art, and thereby, if a length of the change pattern of the signal strength is set to be very long, a real-time nature of the localization of the moving node 1 may be degraded. However, a shape similarity between the surface representing the change pattern of the signal strength up to a current position of the moving node 1 and the surface representing the distribution pattern of the signal strength represented by the map data can be rapidly determined by using the three-dimensional shape matching algorithm, and thereby, the real-time nature of the localization of the moving node 1 may be guaranteed even in a case where the length of the change pattern of the signal strength over the plurality of time points is very long.

Figure 10:
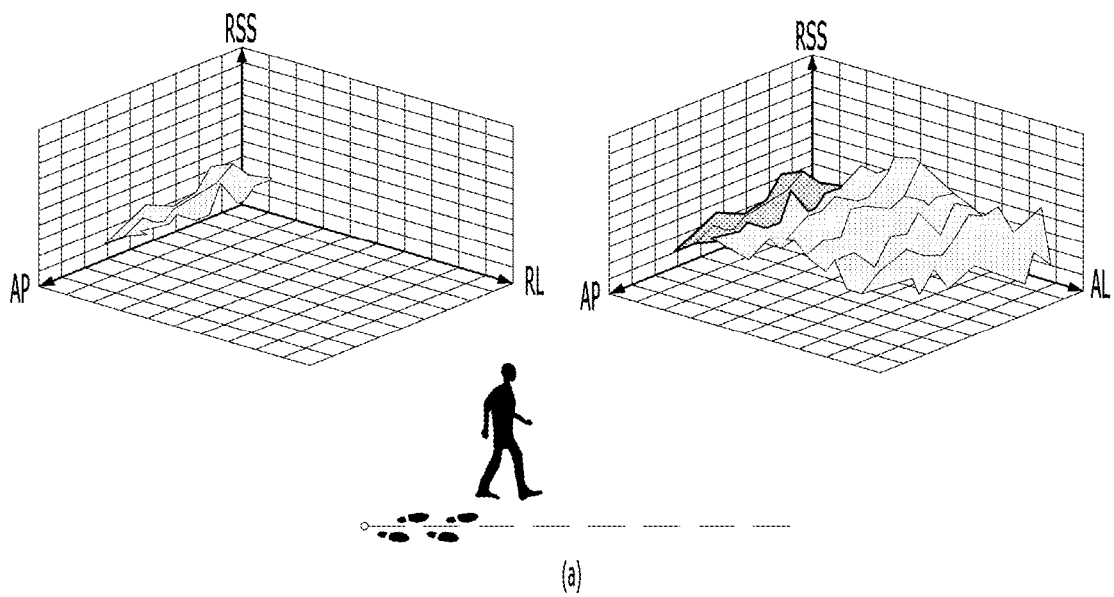
FIGS. 10A and 10B are diagrams illustrating examples in which an absolute position of the moving node is estimated according to the present embodiment.
Figure 10:
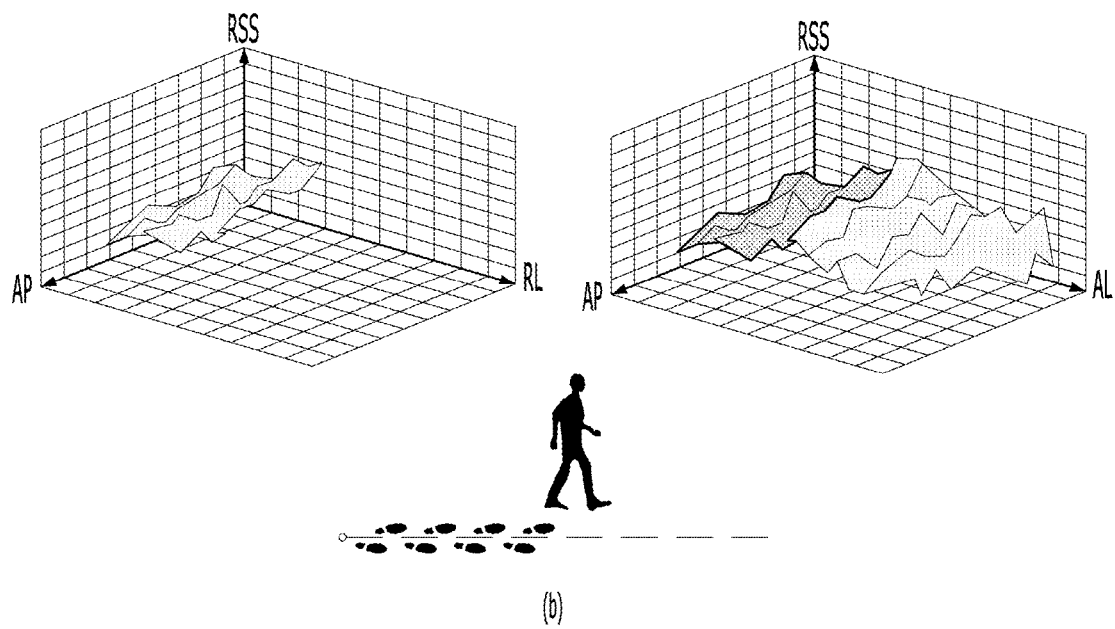
Figure 11:
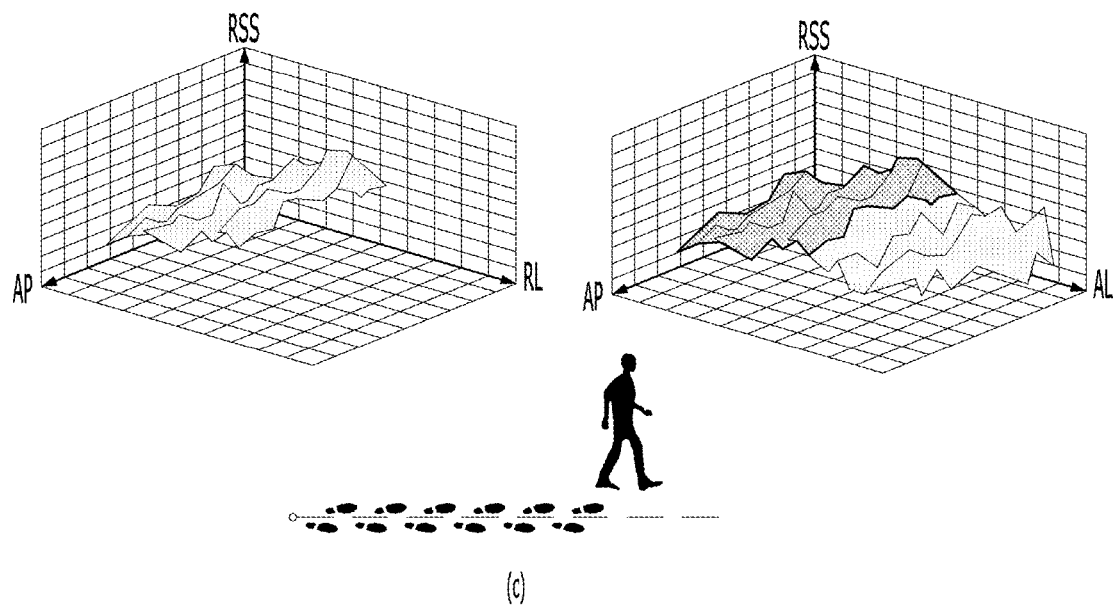
FIGS. 11C and 11D are diagrams illustrating examples in which an absolute position of the moving node is estimated in accordance with the present embodiment.
Figure 11:
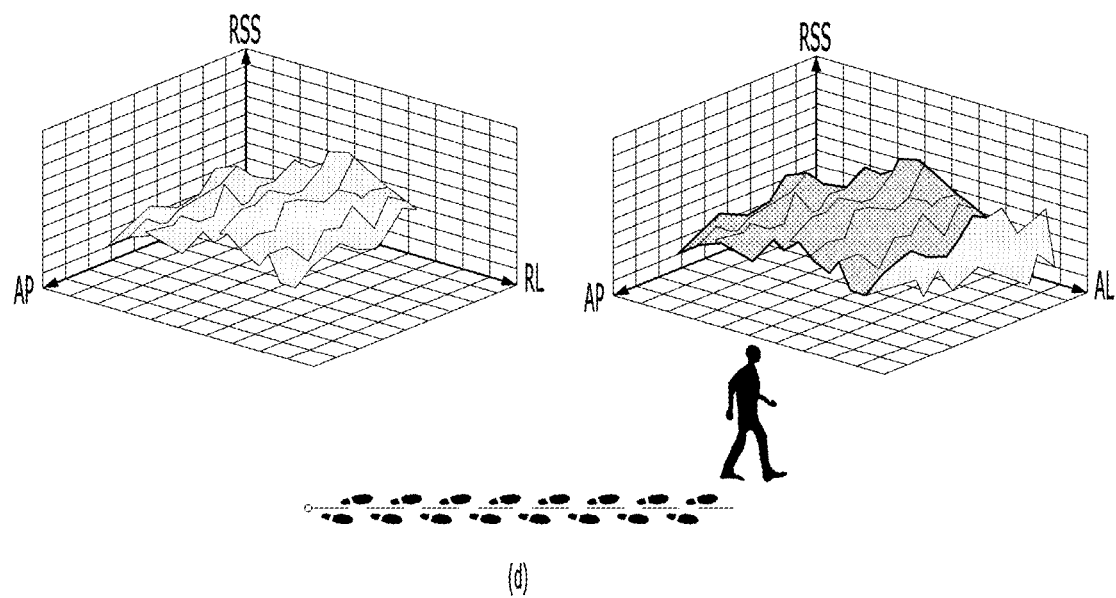

FIGS. 10 and 11 are diagrams illustrating examples in which the absolute position of the moving node 1 is estimated in accordance with the present embodiment. Scales of the three-dimensional space coordinate system illustrated in FIGS. 10 and 11 are the same as the scale of the three-dimensional space coordinate system illustrated in FIG. 7, and pattern examples based on the relative positions of the moving node 1 illustrated on the left side of FIGS. 10 and 11 are the same as the example illustrated in FIG. 9. Pattern example of based on the absolute positions of maps illustrated on the right side of FIGS. 10 and 11 illustrate maps of the distribution pattern of the signal strength for a movement route up to 100 meters. A map represented by the map data provided by the localization server 3 is much larger than the maps illustrated on the right side of FIGS. 10 and 11, but only a part relating to the matching with the patterns illustrated on the left side of FIGS. 10 and 11 in the map represented by the map data is illustrated on the right side of FIGS. 10 and 11 due to limitation of a size of paper. When a user moves by 20 meters, a three-dimensional pattern of a surface shape illustrated on the left side of FIG. 10A is generated.

According to a matching method based on the surface correlation described above, the comparison unit 18 searches a boldly-marked part in the pattern map illustrated on the right side of FIG. 10A. Likewise, when a user moves 40 meters, 60 meters, and 80 meters, three-dimensional patterns of a surface shape illustrated on the left sides of (b), (c), and (d) of FIGS. 10 and 11 are sequentially generated. The comparison unit 18 sequentially searches the boldly-marked parts in the pattern maps illustrated on the right sides of (b), (c), and (d) of FIGS. 10 and 11. The absolute position estimation unit 19 estimates the relative position estimated in step 230 among a plurality of absolute positions of a part searched in step 510, that is, a plurality of absolute positions of the surface part, that is, the absolute position corresponding to the last estimated relative position, as the absolute position of the moving node 1. A correspondence relationship between the relative position and the absolute position is determined from a shape matching relationship between the two surfaces. That is, the absolute position estimation unit 19 estimates an absolute position of the part having a shape most similar to the shape of the relative position estimated in step 230 among a plurality of absolute positions of the surface part searched in step 510, as the absolute position of the moving node 1.

Figure 12:
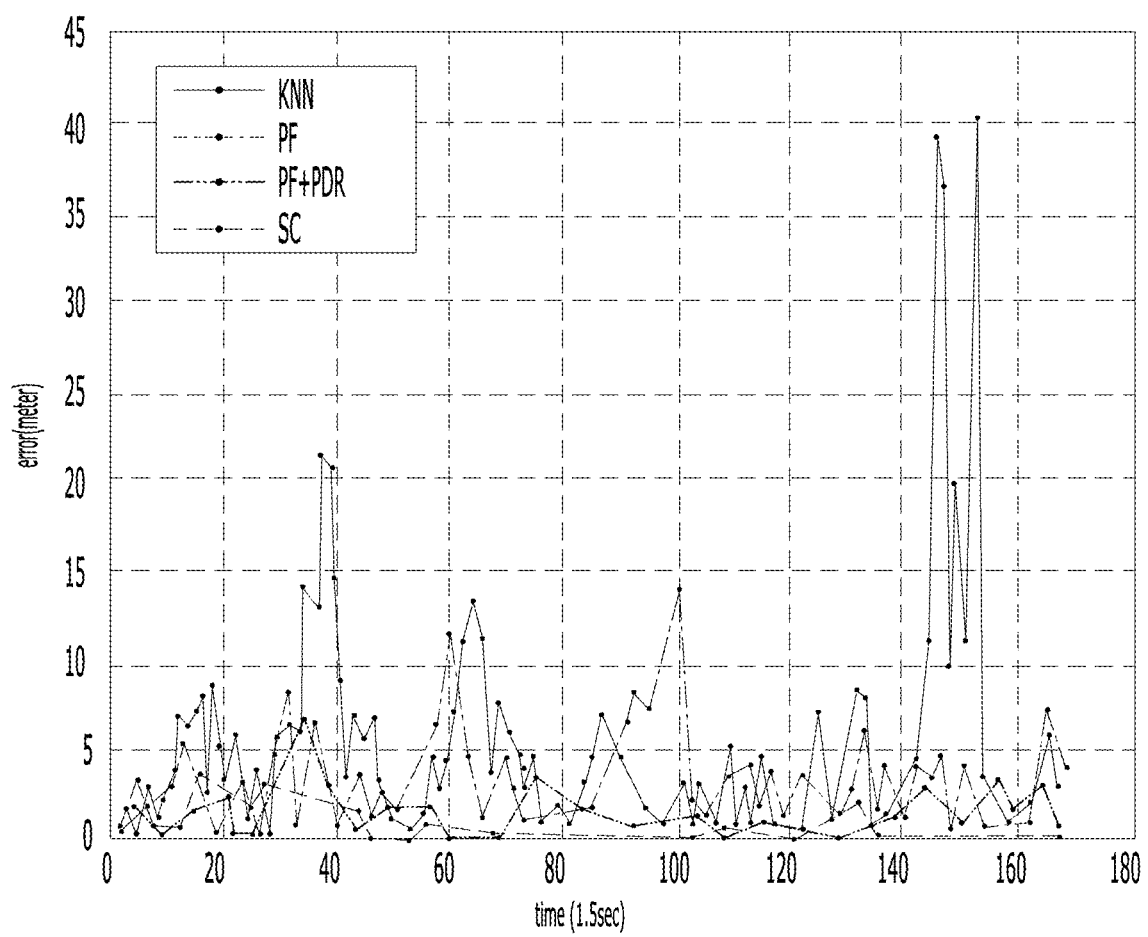
FIG. 12 is a diagram illustrating results of a comparison experiment for Wi-Fi localization according to the related art and the present embodiment.

FIG. 12 is a diagram illustrating results of a comparison experiment for Wi-Fi localization according to the related art and the present embodiment. A k-nearest neighbor (KNN) algorithm widely known as wireless localization technology of related art, a particle filter algorithm, and an algorithm obtained by combining a particle filter and PDR, and a wireless localization algorithm based on a surface correlation (SC) according to the present embodiment, were respectively generated by using an Android application, and were installed in a smartphone, and a user moved the same route with the smartphone inside a building used for the experiment of FIG. 5, while executing each of the four type localization algorithms using a Wi-Fi signal. FIG. 12 illustrates an error between a position of a moving node estimated by each localization algorithm and the actual position.

In FIG. 12, a localization error of the KNN algorithm is marked by a solid line, a localization error of the particle filter algorithm is marked by an alternate long and short dash line, a localization error of the algorithm obtained by combining the particle filter and the PDR is marked by an alternate long and two short dashes line, and a localization error of the present embodiment is marked by a dotted line. Referring to FIG. 12, although the localization error of the algorithm obtained by combining the particle filter and the PDR is relatively small compared with the other localization algorithms, it can be seen that the localization error of the present embodiment maintains a very low level compared with the localization algorithm of related art. Particularly, it can be seen that an average value and a maximum value of the localization error according to the present embodiment are much smaller than a localization error of the localization algorithm of related art from FIG. 12.

Various wireless localization algorithms including the KNN algorithm, the particle filter algorithm, and the algorithm obtained by combining the particle filter and the PDR estimate the position of the moving node 1 in common using only the currently received signal strength. In a case where a signal strength different from the signal strength received at the time of building the radio map is measured due to a wireless environment change such as signal interference between communication channels, expansion of an access point, and occurrence of a failure or an obstacle, points adjacent to each other in the radio map have a similar signal strength distribution, and thereby, the wireless localization algorithm of related art has a very high probability that a current position of the moving node 1 is estimated to be an adjacent position other than an actual position thereof. The larger the difference between the strength of the signal received at the time of building the radio map and the strength of the currently received signal, the greater the localization error.

As described above, the present embodiment estimates the position of the moving node 1 using the change pattern of at least one signal strength according to the relative change of the position of the moving node over a plurality of time points, and thereby, an error of the estimated value of the current position of the moving node 1 rarely occurs, even if there occurs a wireless environment change such as signal interference between communication channels, expansion of an access point, and occurrence of a failure or an obstacle. That is, the present embodiment estimates the current position of the moving node 1, based on the change pattern of the signal strength, in consideration of not only the strength of the currently received signal but also all the past signal strengths received in the route where the moving node 1 passes through so far, and thereby, the wireless environment change in the current position of the moving node 1 rarely influences the estimation in the current position of the moving node 1.

The adjacent point of the actual position of the moving node 1, which is estimated when only the strength of the currently received signal is considered due to the wireless environment change according to the wireless localization algorithm of related art, becomes a point deviating from the route represented by the change pattern of the signal strength so far. According to the present embodiment, the wireless environment chant in the position where the moving node 1 is currently located is not able to change the entire change pattern of the signal strength received in the route where the moving node 1 passes through so far, and changes a current time point of such a pattern. Accordingly, if a position of the moving node 1 is estimated by using a change pattern of at least one signal strength according to a relative change of a position of a moving node over a plurality of time points so far, there is a high possibility that an actual position of the moving node 1 is estimated as an absolute position of the moving node 1 rather than an adjacent position of the actual position of the moving node 1 estimated according to the wireless localization algorithm of related art. Of course, if the wireless environment change continuously occurs at various points on a movement route of the moving node 1, a localization error may occur, but this case rarely occurs.

Particularly, a strength of a signal received from a certain fixed node 2 reaches a peak when going around the fixed node, and the peak tends to be rarely influenced by the wireless environment change. Accordingly, if a length of the change pattern of the signal strength used for the localization according to the present embodiment is sufficiently lengthened within a limitation where a real-time nature of the localization is guaranteed such that the currently received signal includes peak parts of various signals on the route where the moving node 1 passes previously although not a part adjacent to the peak, the peak becomes very robust to the wireless environment change. In addition to this, a positional change between the peaks in the change pattern of the signal strength used for the localization according to the present embodiment can be correctly estimated by estimating the relative position of the moving node 1 within a relatively short distance without error accumulation according to the estimation of the relative position, and thereby, accuracy of estimation of a position of the moving node 1 can be greatly improved even in a case where the wireless environment change is severe.

As described above, the change pattern of the signal strength used for the localization according to the present embodiment is a three-dimensional pattern of a geometric surface shape graphically representing a change of at least one signal strength according to a relative change of a position of the moving node 1, and, when viewing from a viewpoint of comparison between a three-dimensional pattern of a surface shape of the moving node 1 and a three-dimensional pattern of a surface shape of map data, the wireless environment change in a current position of the moving node 1 results in a height error only of a surface part corresponding to the strength of the currently received signal, and does not influence most of the surfaces corresponding to points other than a point of the wireless environment change. That is, the wireless environment change in the current position of the moving node 1 does not substantially influence the entire shape of the surface, although causing some deformation of the surface shape.

Since the wireless localization algorithm of related art compares a numerical value of a currently received signal strength with a numerical value of a signal strength distributed in a radio map, it leads to a result that a point adjacent to the actual position of the moving node 1 having a numerical value most similar to the numerical value of the currently received signal strength is wrongly estimated as a position of the moving node 1. According to the present embodiment, the wireless environment change in the current position of the moving node 1 rarely influences the entire shape of the surface, and thereby, when a surface part having the shape most similar to the surface shape of the three-dimensional pattern is searched within the map represented by the map data, there is a very low possibility that a surface part different from the surface part to be originally searched is searched due to an error of a strength of the currently received signal. As described above, the localization error of the algorithm of related art according to the comparison between the numerical value of the currently received signal strength and the numerical value of the signal strength distributed in the radio map can be originally blocked, and thereby, localization accuracy of the moving node 1 can be greatly improved.

Figure 13:
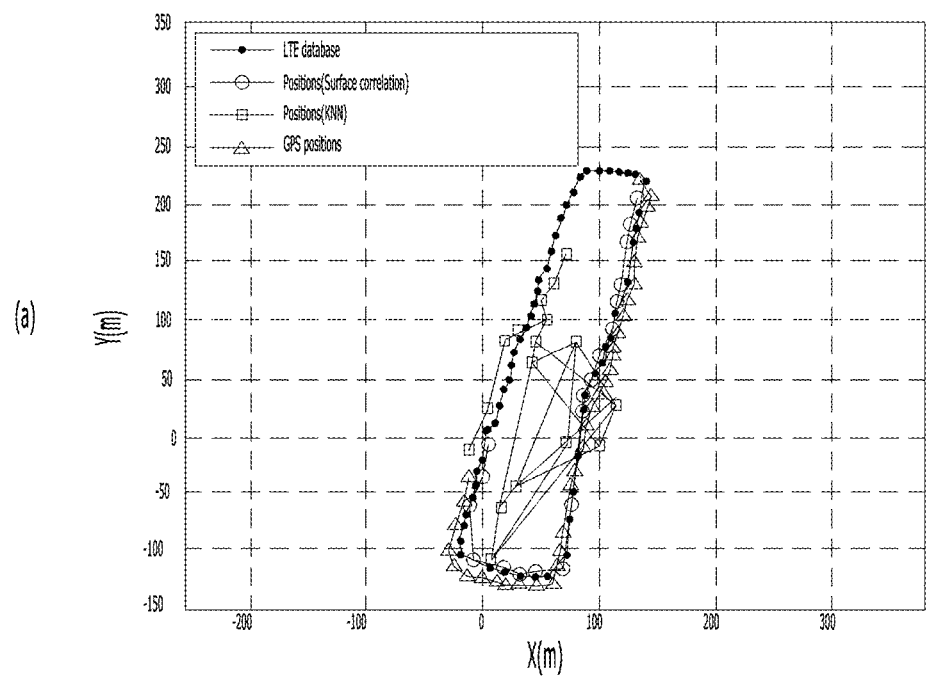
FIGS. 13A and 13B are diagrams illustrating results of the comparison experiment for LTE localization according to the related art and the present embodiment.
Figure 13:
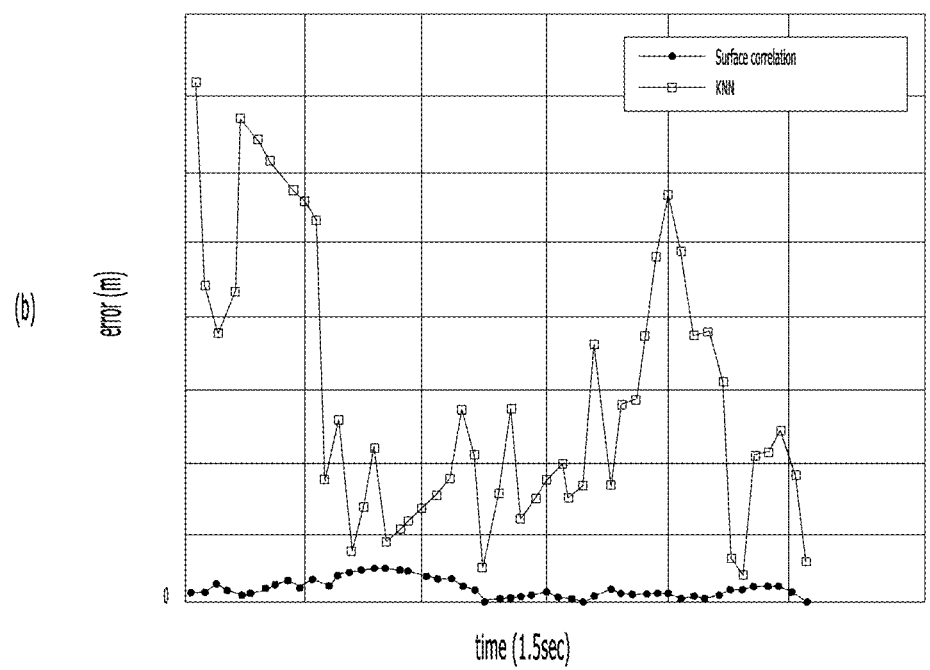

FIGS. 13A and 13B are diagrams illustrating results of a comparison experiment for LTE localization according to the prior art and the present embodiment. A user moved the same route with a smartphone, while executing the wireless localization algorithm based on the surface correlation according to the present embodiment and the KNN algorithm using an LTE signal. FIG. 13A illustrates a movement route estimated by the wireless localization algorithm based on the surface correlation according to the present embodiment with respect to an actual movement route "LTE database" of the moving node 1, a movement route estimated by the KNN algorithm, and a movement route estimated by a GPS. FIG. 13B illustrates an error difference between a position of the moving node 1 estimated by each of the KNN algorithm and the wireless localization algorithm based on the surface correlation according to the present embodiment among the methods illustrated in FIG. 13 and an actual position of the moving node 1.

In FIG. 13A, the positions of the moving node 1 estimated by the wireless localization algorithm based on the surface correlation according to the present embodiment are marked by circles, the positions of the moving node 1 estimated by the KNN algorithm are marked by rectangles, and the positions of the moving node 1 estimated by the GPS are marked by triangles. Referring to FIG. 13A, it can be seen that the positions of the moving node 1 estimated by the KNN algorithm have a phenomenon that the positions jump out of an actual movement route. In contrast to this, it can be seen that the wireless localization algorithm based on the surface correlation according to the present embodiment estimates accurately and stably the positions of the moving node 1 along the actual movement route of the moving node 1. Particularly, it can be seen that the wireless localization algorithm based on the surface correlation according to the present embodiment more accurately estimates the positions of the moving node 1 than the GPS which is known to have the highest localization accuracy so far.

In FIG. 13B, localization errors of the wireless localization algorithm based on the surface correlation according to the present embodiment are marked by black dots, and localization errors of the KNN algorithm are marked by squares. Referring to FIG. 13B, it can be seen that, in a case where the positions of the moving node 1 are estimated by using the LTE signal, the localization error according to the present embodiment is maintained at a very low level compared with the localization algorithm of related art. Since a base station of an LTE network costs much more than an access point of a Wi-Fi network to install, the base stations is installed as far as possible from an adjacent base station so as not to overlap a relay service region thereof. As a result, there are characteristics that LTE signals are uniformly distributed throughout indoor and outdoor spaces, but a region where a change of the signal strength is not large is wide.

As described above, since the wireless localization algorithm of related art estimates a position of the moving node 1 using only the currently received signal strength in common, in a case where there is almost no change in the signal strength between the localization points on a movement route of the moving node 1, not only the localization points cannot be distinguished only by the signal strength, but also the signal strength is very sensitive to peripheral noise, and thereby, a localization error becomes very larger. As illustrated in FIG. 13A, positions of the moving node 1 estimated by the wireless localization algorithm of related art jump out of an actual movement route of the moving node 1.

Even in a case where a strength of the LTE signal is hardly changed between adjacent localization points on a movement route of the moving node 1, if a length of a change pattern of a signal strength used for the localization according to the present embodiment is sufficiently lengthened within a limitation where a real-time nature of localization of the moving node 1 is guaranteed, a strength of the LTE signal is sufficiently changed to the extent that an accurate position estimation of the moving node 1 can be performed within a movement distance corresponding to a length of a change pattern of the signal strength. Accordingly, even in a case where there is almost no change in the strength of the LTE signal between the adjacent localization points on the movement route of the moving node 1, the present embodiment can accurately estimate the position of the moving node 1.

As described above, the present embodiment can accurately estimate a position of the moving node 1 by using an LTE signal with almost no change in a signal strength between measurement points on a movement route, thereby, being able to provide a wireless localization service which can cover both an indoor space and an outdoor space. As a result, the present embodiment can provide a car navigation system or a wireless localization service for autonomous driving which can perform a highly accurate indoor localization and outdoor localization even in the center of a city without being influenced by a skyscraper by using LTE signals widely distributed in the inside of a building and the center of a city, thereby, being replaced with the GPS which is widely used as a car navigation system nowadays but cannot be used for indoor localization and of which localization accuracy is significantly degraded in the center of a city.

In the above, comparative experiments were performed with respect to the related art and the present embodiment by using a WiFi signal and an LTE signal, and superiority of localization accuracy of the present embodiment is described. Signals that can be used for the wireless localization according to the present embodiment are not limited to this, and the localization according to the present embodiment can be performed by using strength of a radio signal such as Bluetooth, Zigbee, Lora, or the like.

Meanwhile, the wireless localization method according to the embodiment of the present invention described above can be implemented by a program executable in a processor of a computer, and can be implemented by a computer that records the program in a computer-readable recording medium and execute the program. The computer includes any type of computer capable of executing a program, such as a desktop computer, a notebook computer, a smartphone, an embedded type computer, and the like. In addition, a structure of data used for the above-described embodiment according to the present invention can be recorded in a computer-readable recording medium through various means. The computer readable recording medium includes a storage medium such as a RAM, a ROM, a magnetic storage medium (for example, a floppy disk, a hard disk, and the like), and an optically readable medium (for example, a CD ROM, a DVD, and the like).

The present invention is described above with reference to preferred embodiments thereof. It will be understood by those skilled in the art that the present invention may be embodied in various forms without departing from the spirit or essential characteristics thereof. Therefore, the disclosed embodiments should be considered in an illustrative viewpoint rather than a restrictive viewpoint. The scope of the present invention is defined by the appended claims rather than by the above description, and all differences within the scope of equivalents thereof should be construed as being included in the present invention.

The invention claimed is:

1. A wireless localization method comprising:
   measuring strength of at least one signal that is transmitted from at least one fixed node;
   estimating a relative position of a moving node;
   generating a change pattern of at least one signal strength according to relative changes in positions of the moving node over a plurality of time points from the measured at least one signal strength and the estimated relative position of the moving node; and
   estimating an absolute position of the moving node, based on a comparison between the generated change pattern of the at least one signal strength and a map of a distribution pattern shape of signal strength in a region where the moving node is located, wherein the generating of the change pattern of the at least one signal strength generates the change pattern of the at least one signal strength by accumulating pattern data representing a pattern of at least one signal strength that is received from the at least one fixed node at the estimated relative position on pattern data for a relative position which is estimated prior to estimation of the relative position.

2. The wireless localization method of claim 1, wherein the change pattern of the at least one signal strength is a change pattern of at least one signal strength that is represented as continuous arrangement of at least one signal strength which is received a plurality of times at a plurality of relative positions of the moving node that is estimated at the plurality of time points.

3. The wireless localization method of claim 1, wherein the generating of the change pattern of the at least one signal strength generates the pattern data from spatial domain data representing the measured each signal strength in association with the estimated relative position.

4. The wireless localization method of claim 3, further comprising:
generating time domain data representing the measured each signal strength in association with a certain time point; and
converting the generated time domain data into the spatial domain data.

5. The wireless localization method of claim 4, wherein the certain time point is a reception time point of the each signal, and the measured relative position is a relative position of the moving node that is estimated at the reception time point of the each signal.

6. The wireless localization method of claim 1, wherein, if a distance difference between the estimated relative position and the relative position of the moving node that is estimated immediately before the relative position is estimated is within a distance corresponding to a resolution unit of coordinates for representing the relative position of the moving node, accumulation of pattern data representing a pattern of at least one signal strength which is received from the at least one fixed node at the estimated relative position is omitted.

7. The wireless localization method of claim 1, further comprising:
searching a part having a pattern most similar to the change pattern of the at least one signal strength within the map by comparing the change pattern of the at least one signal strength with the map,
wherein the estimating of the absolute position of the moving node estimates an absolute position of a map indicated by the searched part as the absolute position of the moving node.

8. The wireless localization method of claim 7, wherein the estimating of the absolute position of the moving node estimates an absolute position corresponding to the estimated relative position among a plurality of absolute positions of the searched part as the absolute position of the moving node.

9. The wireless localization method of claim 1, further comprising:
selecting at least one cluster among clusters in an entire region where a localization service is provided, based on the received at least one signal; and
extracting map data representing the map from a radio map in which distribution data of signal strength in the entire region is recorded.

10. A wireless localization method comprising:
measuring strength of at least one signal that is transmitted from at least one fixed node;
estimating a relative position of a moving node;
generating a change pattern of at least one signal strength according to relative changes in positions of the moving node over a plurality of time points from the measured at least one signal strength and the estimated relative position of the moving node; and
estimating an absolute position of the moving node, based on a comparison between the generated change pattern of the at least one signal strength and a map of a distribution pattern shape of signal strength in a region where the moving node is located,
wherein the change pattern of the at least one signal strength is a change pattern of at least one signal strength that is represented as continuous arrangement of at least one signal strength which is received a plurality of times at a plurality of relative positions of the moving node that is estimated at the plurality of time points, and
wherein the generating of the change pattern of the at least one signal strength generates a pattern of at least one signal strength that is currently received from the measured at least one signal strength and the estimated relative position of the moving node, and generates the change pattern of the at least one signal strength by continuously arranging the pattern of the generated at least one signal on a pattern of at least one signal which is received prior to the received time point.

11. A wireless localization method comprising:
measuring strength of at least one signal that is transmitted from at least one fixed node;
estimating a relative position of a moving node;
generating a change pattern of at least one signal strength according to relative changes in positions of the moving node over a plurality of time points from the measured at least one signal strength and the estimated relative position of the moving node;
estimating an absolute position of the moving node, based on a comparison between the generated change pattern of the at least one signal strength and a map of a distribution pattern shape of signal strength in a region where the moving node is located; and
estimating the relative position of the moving node with respect to an estimated absolute position of the moving node after the absolute position of the moving node is estimated,
wherein a change pattern of at least one signal strength according to a relative change of a position of the moving node is generated from the relative position of the moving node that is estimated with respect to the absolute position of the moving node after the plurality of time points.

12. A wireless localization method comprising:
measuring strength of at least one signal that is transmitted from at least one fixed node;
estimating a relative position of a moving node;
generating a change pattern of at least one signal strength according to relative changes in positions of the moving node over a plurality of time points from the measured at least one signal strength and the estimated relative position of the moving node; and estimating an absolute position of the moving node, based on a comparison between the generated change pattern of the at least one signal strength and a map of a distribution pattern shape of signal strength in a region where the moving node is located, wherein the generating of the change pattern of the at least one signal strength generates a pattern of a geometric surface shape that graphically represents a change of at least one signal strength according to a relative change of a position of the moving node in such a manner that a dot is marked on a point of a multidimensional space which is determined by mapping an ID of a certain fixed node on a first axis of the multidimensional space, mapping the relative position of the moving node on a second axis, and mapping strength of a signal which is transmitted from the certain fixed node on a third axis.

13. The wireless localization method of claim 12, further comprising:

searching a surface part having a shape most similar to the surface shape within the map by comparing the pattern of the surface shape with the map, wherein the estimating of the absolute position of the moving node estimates an absolute position of the map that is indicated by the searched surface part as the absolute position of the moving node.

14. The wireless localization method of claim 13, wherein the estimating of the absolute position of the moving node estimates an absolute position of a part having a shape most similar to a shape of the estimated relative position among a plurality of absolute positions of the searched surface part as the absolute position of the moving node.

15. A non-transitory computer-readable recording medium comprising a computer program, which when executed by a processor, causes the processor to perform the wireless localization method of claim 1.

16. A wireless localization apparatus comprising:

a signal processing unit comprising one or more processor configured to measure strength of at least one signal which is transmitted from at least one fixed node;

a relative position estimation unit comprising the one or more processor configured to estimate a relative position of a moving node;

a pattern generation unit comprising the one or more processor configured to generate a change pattern of at least one signal strength according to relative changes in positions of the moving node over a plurality of time points from the measured at least one signal strength and the estimated relative position of the moving node; and an absolute position estimation unit comprising the one or more processor configured to estimate an absolute position of the moving node, based on a comparison between the generated change pattern of the at least one signal strength and a map of a distribution pattern shape of signal strength in a region where the moving node is located, wherein the pattern generation unit generates the change pattern of the at least one signal strength by accumulating pattern data representing a pattern of at least one signal strength that is received from the at least one fixed node at the estimated relative position on pattern data for a relative position which is estimated prior to estimation of the relative position.

17. The wireless localization apparatus of claim 16, further comprising:

a sensor unit comprising one or more sensor configured to sense movement of the moving node, wherein the relative position estimation unit comprising the one or more processor estimates the relative position of the moving node from a value of an output signal of the sensor unit.

18. The wireless localization apparatus of claim 16, further comprising:

a buffer that accumulates pattern data which is generated by the pattern generation unit, wherein the pattern generation unit comprising the one or more processor generates the change pattern of the at least one signal strength by accumulating pattern data representing a pattern of at least one signal strength that is received from the at least one fixed node at the estimated relative position on pattern data which is stored in the buffer and storing the accumulated data.

* * * * *